US012755139B2

(12) United States Patent
Judd et al.

(10) Patent No.: US 12,755,139 B2
(45) Date of Patent: *Oct. 6, 2026

(54) ACCELERATOR FOR DEEP NEURAL NETWORKS

(71) Applicant: Samsung Electronics Co., Ltd., Suwon-si (KR)

(72) Inventors: Patrick Judd, Toronto (CA); Jorge Albericio, San Jose, CA (US); Alberto Delmas Lascorz, Toronto (CA); Andreas Moshovos, Toronto (CA); Sayeh Sharifymoghaddam, Toronto (CA)

(73) Assignee: Samsung Electronics Co., Ltd., Suwon-si (KR)

( * ) Notice: Subject to any disclaimer, the term of this patent is extended or adjusted under 35 U.S.C. 154(b) by 841 days.

This patent is subject to a terminal disclaimer.

(21) Appl. No.: 18/108,292

(22) Filed: Feb. 10, 2023

(65) Prior Publication Data

US 2023/0186065 A1 Jun. 15, 2023

Related U.S. Application Data

(63) Continuation of application No. 16/504,275, filed on Jul. 7, 2019, now Pat. No. 11,610,100, which is a (Continued)

(51) Int. Cl.

| | |
|---|---|
| ***G06N 20/00*** | (2019.01) |
| ***G06N 3/049*** | (2023.01) |
| ***G06N 3/063*** | (2023.01) |

(52) U.S. Cl.

CPC ............ *G06N 3/063* (2013.01); *G06N 3/049* (2013.01)

(58) Field of Classification Search

None

See application file for complete search history.

(56) References Cited

U.S. PATENT DOCUMENTS 5,369,731 A 11/1994 Masumoto et al.
5,444,822 A 8/1995 Shinohara (Continued)

FOREIGN PATENT DOCUMENTS

KR 2000-0052725 A 8/2000
WO WO 2010/142987 A1 12/2010

OTHER PUBLICATIONS

Buric, et al. "Bit-serial inner product processors in VLSI." *CaltechAUTHORS a Caltech Library Service* Jan. 1981 (pp. 155-164).

(Continued)

*Primary Examiner* — David R Vincent
(74) *Attorney, Agent, or Firm* — NSIP Law

(57) ABSTRACT

A system for bit-serial computation in a neural network is described. The system may be embodied on an integrated circuit and include one or more bit-serial tiles for performing bit-serial computations in which each bit-serial tile receives input neurons and synapses, and communicates output neurons. Also included is an activation memory for storing the neurons and a dispatcher. The dispatcher reads neurons and synapses from memory and communicates either the neurons or the synapses bit-serially to the one or more bit-serial tiles. The other of the neurons or the synapses are communicated bit-parallelly to the one or more bit-serial tiles, or according to a further embodiment, may also be communicated bit-serially to the one or more bit-serial tiles.

20 Claims, 28 Drawing Sheets

Related U.S. Application Data continuation of application No. 15/606,118, filed on May 26, 2017, now Pat. No. 10,387,771.

(60) Provisional application No. 62/490,659, filed on Apr. 27, 2017, provisional application No. 62/454,268, filed on Feb. 3, 2017, provisional application No. 62/448,454, filed on Jan. 20, 2017, provisional application No. 62/416,782, filed on Nov. 3, 2016, provisional application No. 62/395,027, filed on Sep. 15, 2016, provisional application No. 62/381,202, filed on Aug. 30, 2016, provisional application No. 62/341,814, filed on May 26, 2016.

(56) References Cited

U.S. PATENT DOCUMENTS

| | | | | |
|---|---|---|---|---|
| 5,751,913 | A | 5/1998 | Chiueh et al. | |
| 6,199,057 | B1 | 3/2001 | Tawel | |
| 6,434,541 | B1 | 8/2002 | Tawel et al. | |
| 2013/0073497 | A1* | 3/2013 | Akopyan | G06N 3/049 706/27 |
| 2015/0170020 | A1 | 6/2015 | Garimella | |
| 2015/0310311 | A1 | 10/2015 | Shi et al. | |
| 2016/0071005 | A1 | 3/2016 | Wang et al. | |
| 2017/0270073 | A1* | 9/2017 | Badin | G06N 3/063 |

OTHER PUBLICATIONS

Murray et al. "Bit-serial neural networks." *Neural Information Processing Systems*. 1987. (pp. 573-583).

White, "Applications of Distributed Arithmetic to Digital Signal Processing: A Tutorial Review," *IEEE ASSP Magazine*, vol. 6, No. 3, Jul. 1989 (pp. 4-19).

Park et al. "Dynamic Bit-Width Adaptation in DCT: An Approach to Trade Off Image Quality & Computation Energy," *IEEE Transactions on VLSI* vol. 18, No. 5, May 2010 (pp. 787-793).

Chen et al. "DaDianNao: A Machine-Learning Supercomputer," *2014 47th Annual IEEE/ACM on Microarchitecture*, Dec. 2014 (pp. 1-14).

Karpathy et al. "Deep Visual—Semantic Alignments for Generating Image Descriptions", *Proceedings of the IEEE conference on computer vision and pattern recognition* 2015 (pp. 1-17).

Judd et al. "Reduced-Precision Strategies for Bounded Memory in Deep Neural Nets", *arXiv preprint arXiv:1511.05236v4*. 2016 (pp. 1-12).

Extended European Search Report issued Jan. 10, 2022 in counterpart European Patent Application No. 17 801 877.6 (pp. 1-13).

* cited by examiner

| Network | Convolutional layers | | Fully-Connected layers | |
|---|---|---|---|---|
| | Per Layer Activation Precision in Bits | Ideal Speedup | Per Layer Activation and Weight Precision in Bits | Ideal Speedup |
| **100% Accuracy** | | | | |
| AlexNet | 9-8-5-5-7 | 2.38 | 10-9-9 | 1.66 |
| VGG_S | 7-8-9-7-9 | 2.04 | 10-9-9 | 1.64 |
| VGG_M | 7-7-7-8-7 | 2.23 | 10-8-8 | 1.64 |
| VGG_19 | 12-12-12-11-12-10-11-11-13-12-13-13-13-13-13-13 | 1.35 | 10-9-9 | 1.63 |
| **99% Accuracy** | | | | |
| AlexNet | 9-7-4-5-7 | 2.58 | 9-8-8 | 1.85 |
| VGG_S | 7-8-9-7-9 | 2.04 | 9-9-8 | 1.79 |
| VGG_M | 6-8-7-7-7 | 2.34 | 9-8-8 | 1.80 |
| VGG_19 | 9-9-9-8-12-10-10-12-13-11-12-13-13-13-13-13 | 1.57 | 10-9-8 | 1.63 |

FIG. 17

| | Fully Connected Layers | | | | Convolutional Layers | | | |
|---|---|---|---|---|---|---|---|---|
| Accuracy | 100% | | 99% | | 100% | | 99% | |
| | Perf | Eff | Perf | Eff | Perf | Eff | Perf | Eff |
| AlexNet | 1.61 | 1.06 | 1.80 | 1.19 | 2.32 | 1.43 | 2.52 | 1.55 |
| VGG_S | 1.61 | 1.05 | 1.76 | 1.16 | 1.97 | 1.21 | 1.97 | 1.21 |
| VGG_M | 1.61 | 1.06 | 1.77 | 1.17 | 2.18 | 1.34 | 2.29 | 1.40 |
| VGG_19 | 1.60 | 1.05 | 1.61 | 1.06 | 1.35 | 0.83 | 1.56 | 0.96 |
| geomean | 1.61 | 1.06 | 1.73 | 1.14 | 1.91 | 1.18 | 2.05 | 1.26 |

FIG. 18

| | Fully Connected Layers | | Convolutional Layers | |
|---|---|---|---|---|
| | vs. DaDN | vs. 1b TRT | vs. DaDN | vs. 1b TRT |
| AlexNet | +58% | -2.06% | +208% | -11.71% |
| VGG_S | +59% | -1.25% | +76% | -12.09% |
| VGG_M | +63% | +1.12% | +91% | -13.78% |
| VGG_19 | +59% | -0.97% | +29% | -4.11% |
| **geomean** | +60% | -0.78% | +73% | -10.36% |

FIG. 19

| Network | Fully connected layers | |
|---|---|---|
| | Per Layer Weight Precision in Bits | Per Layer Weight Precision in Bits |
| | 100% Accuracy | 99% Accuracy |
| AlexNet | 10-9-9 | 9-8-8 |
| GoogLeNet | 7 | 7 |
| VGG_S | 10-9-9 | 9-9-8 |
| VGG_M | 10-8-8 | 9-8-8 |
| VGG_19 | 10-9-9 | 10-9-8 |

FIG. 23

| | Fully-connected Layers | | | | | | | | Convolutional Layers | | | | | | | |
|---|---|---|---|---|---|---|---|---|---|---|---|---|---|---|---|---|
| **Design** | **2-bit** | | | | **4-bit** | | | | **2-bit** | | | | **4-bit** | | | |
| **Accuracy** | **100%** | | **99%** | | **100%** | | **99%** | | **100%** | | **99%** | | **100%** | | **99%** | |
| | **Perf** | **Eff** | **Perf** | **Eff** | **Perf** | **Eff** | **Perf** | **Eff** | **Perf** | **Eff** | **Perf** | **Eff** | **Perf** | **Eff** | **Perf** | **Eff** |
| NiN | | | | | | | | | 2.46 | 2.35 | 3.35 | 3.20 | 2.28 | 2.43 | 2.99 | 3.18 |
| AlexNet | 1.66 | 1.58 | 1.85 | 1.76 | 1.66 | 1.76 | 1.85 | 1.97 | 3.14 | 3.00 | 3.28 | 3.13 | 2.88 | 3.06 | 3.12 | 3.32 |
| GoogLeNet | 2.27 | 2.16 | 2.27 | 2.16 | 2.28 | 2.42 | 2.28 | 2.42 | 1.84 | 1.75 | 2.12 | 2.02 | 1.66 | 1.77 | 1.99 | 2.11 |
| VGG_S | 1.63 | 1.56 | 1.78 | 1.70 | 1.63 | 1.74 | 1.79 | 1.90 | 2.58 | 2.46 | 2.58 | 2.46 | 2.37 | 2.53 | 2.37 | 2.53 |
| VGG_M | 1.64 | 1.56 | 1.80 | 1.72 | 1.64 | 1.74 | 1.80 | 1.92 | 2.82 | 2.69 | 2.59 | 2.47 | 2.87 | 3.06 | 2.63 | 2.80 |
| VGG_19 | 1.63 | 1.55 | 1.63 | 1.56 | 1.63 | 1.73 | 1.63 | 1.74 | 1.71 | 1.63 | 1.72 | 1.64 | 1.61 | 1.71 | 1.56 | 1.66 |
| **geomean** | 1.74 | 1.67 | 1.85 | 1.77 | 1.75 | 1.86 | 1.86 | 1.98 | 2.37 | 2.26 | 2.54 | 2.42 | 2.22 | 2.36 | 2.38 | 2.53 |

FIG. 24

ACCELERATOR FOR DEEP NEURAL NETWORKS

CROSS-REFERENCE TO RELATED APPLICATIONS

This application is continuation of application Ser. No. 16/504,275 filed on Jul. 7, 2019, the entire disclosure of which is incorporated herein by reference in its entirety, which is a continuation of application Ser. No. 15/606,118 filed on May 26, 2017 (now U.S. Pat. No. 10,387,771 issued Aug. 20, 2019), which claims the benefit of all of U.S. Provisional Application Nos.: 62/490,659 filed Apr. 27, 2017; 62/454,268 filed Feb. 3, 2017; 62/448,454 filed Jan. 20, 2017; 62/416,782 filed Nov. 3, 2016; 62/395,027 filed Sep. 15, 2016; 62/381,202 filed Aug. 30, 2016; and 62/341,814 filed May 26, 2016.

FIELD OF THE INVENTION

The present specification relates generally to neural networks and more particularly to an accelerator for a deep neural network (DNN) with an execution time scalable proportionally with the length of the numerical representation used. This application is continuation of application Ser. No. 16/504,275 filed on Jul. 7, 2019, whose entire disclosure is incorporated by reference in its entirety and which is a continuation of application Ser. No. 15/606,118 filed on May 26, 2017, which claims the benefit of U.S. Provisional Application Nos. 62/490,659, filed Apr. 27, 2017; 62/454,268, filed Feb. 3, 2017; 62/448,454, filed Jan. 20, 2017; 62/416,782, filed Nov. 3, 2016; 62/395,027, filed Sep. 15, 2016; 62/381,202, filed Aug. 30, 2016; and 62/341,814, filed May 26, 2016.

BACKGROUND OF THE INVENTION

Deep Neural Networks (DNNs) are a state-of-the-art technique in many recognition tasks such as object and speech recognition. DNNs comprise a feed-forward arrangement of layers each exhibiting high computational demands and parallelism which are commonly exploited with the use of Graphic Processing Units (GPUs). The high computation demands of DNNs and the need for higher energy efficiency has motivated the development and proposal of special purpose architectures. However, power continues to be a limiting factor in DNN designs.

Accordingly, there remains a need for improvements in the art.

SUMMARY

In accordance with an embodiment, there is provided a bit-serial neural network accelerator.

According to an embodiment, there is provided a system for bit-serial computation in a neural network, comprising: one or more bit-serial tiles for performing bit-serial computations in a neural network, each bit-serial tile receiving input neurons and synapses, and generating output neurons; and an activation memory for storing neurons and in communication with the one or more bit-serial tiles via a dispatcher, wherein the dispatcher reads neurons from the activation memory and communicates the neurons to the one or more bit-serial tiles via a first interface, wherein the dispatcher reads synapses from a memory and communicates the synapses to the one or more bit-serial tiles via a second interface, and wherein one of the first interface and the second interface communicates the neurons or the synapses to the one or more bit-serial tiles bit-serially and the other of the first interface and the second interface communicates the neurons or the synapses to the one or more bit-serial tiles bit-parallelly.

According to a further embodiment, there is provided a system for bit-serial computation in a neural network, comprising: one or more bit-serial tiles for performing bit-serial computations in a neural network, each bit-serial tile receiving input neurons and synapses, and communicating output neurons; and an activation memory for storing neurons and in communication with the one or more bit-serial tiles via a dispatcher, wherein the dispatcher reads neurons from the activation memory and communicates the neurons to the one or more bit-serial tiles via a first interface, wherein the dispatcher reads synapses from a memory and communicates the synapses to the one or more bit-serial tiles via a second interface, and wherein the first interface and the second interface communicate the neurons and the synapses to the one or more bit-serial tiles bit-serially.

According to a further embodiment, each bit-serial tile may further comprise a synapse buffer, an input neuron buffer holding input neurons from the dispatcher and a neuron output buffer holding output neurons pending communication to a reducer, wherein the reducer receives the output neurons from the one or more bit-serial tiles, and communicates the output neurons to the activation memory.

According to a further embodiment, there is provided a battery-operated device comprising a bit-serial neural network accelerator, the battery-operated device comprising: one or more bit-serial tiles for performing bit-serial computations in a neural network, each bit-serial tile receiving input neurons and synapses, and generating output neurons; and an activation memory for storing neurons and in communication with the one or more bit-serial tiles via a dispatcher, wherein the dispatcher reads neurons from the activation memory and communicates the neurons to the one or more bit-serial tiles via a first interface, wherein the dispatcher reads synapses from a memory and communicates the synapses to the one or more bit-serial tiles via a second interface, and wherein one of the first interface and the second interface communicates the neurons or the synapses to the one or more bit-serial tiles bit-serially and the other of the first interface and the second interface communicates the neurons or the synapses to the one or more bit-serial tiles bit-parallelly.

Other aspects and features according to the present application will become apparent to those ordinarily skilled in the art upon review of the following description of embodiments of the invention in conjunction with the accompanying figures.

BRIEF DESCRIPTION OF THE DRAWINGS

Reference will now be made to the accompanying drawings which show, by way of example only, embodiments of the invention, and how they may be carried into effect, and in which:

FIG. 15A shows the engine's structure and FIG. 15B to FIG. 15D shows how it processes a convolutional layer;

FIG. 17 is a table displaying the per layer precision results for fully-connected layers and convolutional layers processed by a neural processing unit according to an embodiment of the invention;

FIG. 18 is a table displaying the execution time and energy efficiency improvement for fully-connected layers and convolutional layers processed by a neural processing unit according to an embodiment of the invention;

FIG. 19 is a table displaying the relative performance for fully-connected layers and convolutional layers of a neural processing unit that processes two activation bits per cycle, according to an embodiment of the invention;

FIG. 23 is a table displaying per layer precision results for fully-connected layers and synapses/weights of a neural processing unit, according to an embodiment;

FIG. 24 is a table displaying execution time performance and energy efficiency for a neural processing unit processing 2 and 4 activation bits per cycle, according to an embodiment of the invention;

Like reference numerals indicated like or corresponding elements in the drawings.

DETAILED DESCRIPTION OF THE EMBODIMENTS

Figure 1:
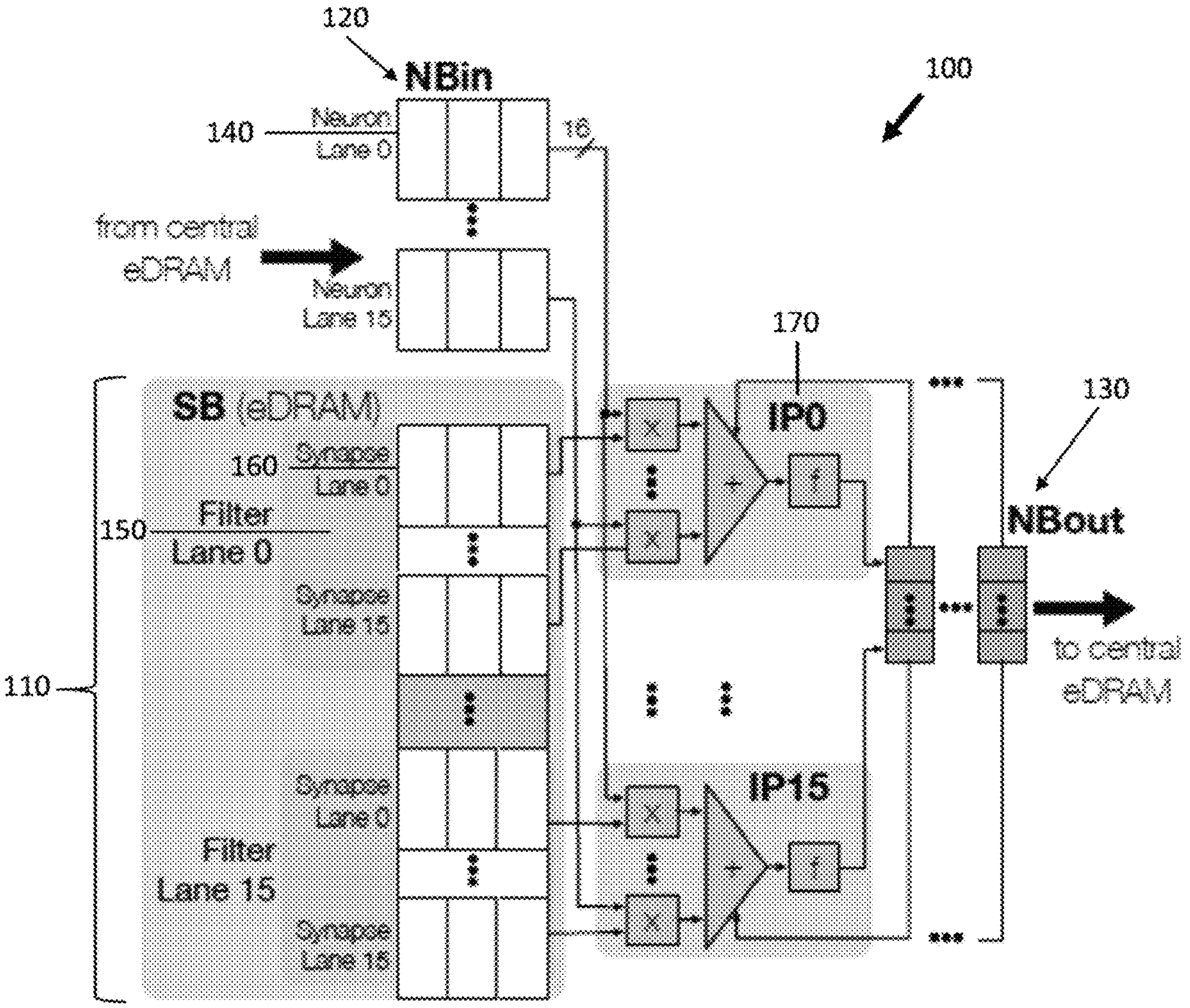
FIG. 1 (PRIOR ART)
FIG. 1 is a prior art bit parallel DNN tile.

FIG. 1 is a bit parallel tile 100 representative of a prior art bit parallel deep neural network (DNN) system, such as the one proposed by Chen et al. [Y. Chen, T. Luo, S. Liu, S. Zhang, L. He, J. Wang, L. Li, T. Chen, Z. Xu, N. Sun, and O. Temam, "DaDianNao: A machine-learning supercomputer," in *Microarchitecture* (*MICRO*), 2014 47*th Annual IEEE/ACM International Symposium on*, pp. 609-622, December 2014.]. Each prior art bit parallel chip comprises 16 such tiles 100. Each tile has a synapse buffer (SB) 110 which provides 256 synapses per cycle, one per synapse sub-lane. The tile also has an input neuron buffer (NBin) 120 which provides 16 neurons per cycle one per neuron lane 140, and a neuron output buffer (NBout) 130 which can accept 16 output neurons per cycle. The computational logic is called the Neural Functional Unit (NFU), or unit. Every cycle, each NFU produces a brick $o_B(q, w, f)$ of partial output neurons. A brick is defined as a collection of 16 elements, preferably adjacent along the third dimension, e.g., o (q, w, f), . . . , o (q, w, f+15), and preferably where f is divisible by 16. The NFU does so by processing one input neuron brick $n_B(x, y, i)$ and 16 synapse bricks one from each of 16 filters: $s_B^f(k, 1, i)$ through $S_B^{f+15}(k, 1, i)$. For this purpose, the NFU has 16 neuron lanes 140 and 16 filter lanes 150 each with 16 synapse lanes 160 for a total of 256 synapse lanes.

Each neuron lane 140 is connected to 16 synapse sub-lanes 160, one from each of the 16 filter lanes 150. A synapse lane 160 multiplies its synapse with an input neuron and the 16 products from all synapse lanes 160 of a filter 150 are reduced into a partial sum. In all, the filter lanes 150 each produce a partial sum per cycle, for a total 16 output neurons per unit. We refer to the logic associated to the production of one output neuron as an inner product unit (IP) 170. Once a full window is processed the 16 resulting sums are fed though a non-linear activation function, f, to produce 16 output neurons. The multiplications and reductions per cycle are implemented as 256 multipliers one per synapse sub-lane 160 and sixteen 17-input adder trees one per output neuron (16 products plus the partial sum from NBout 130).

The goal of the bit parallel system is stated as minimizing off-chip bandwidth while maximizing on-chip compute utilization. To avoid fetching synapses from off-chip the SB 110 is a 32 MB eDRAM distributed in 2 MB chunks, one per NFU allowing it to store all synapses for the layer(s) being processed for best of class networks. Overall, a bit parallel node can process up to 256 filters in parallel, 16 per unit. All inter-layer neuron outputs except for the initial input and final output are stored in shared, 4 MB central eDRAM, or Neuron Memory (NM). Off-chip accesses are needed only for reading the input image, the synapses once per layer, and for writing the final output.

Processing starts by reading from external memory the first layer's filter synapses, and the input image. The synapses are distributed over SBs and the input is stored into NM. Each cycle an input neuron brick, $n_B(x, y, i)$, is broadcast to all units. The layer's output neurons are stored through NBout 130 to NM and then fed back through the NBin 120 when processing the next layer. Loading the next set of synapses from external memory can be overlapped with the processing of the current layer as necessary.

Bit-Serial Processing

Figure 2:
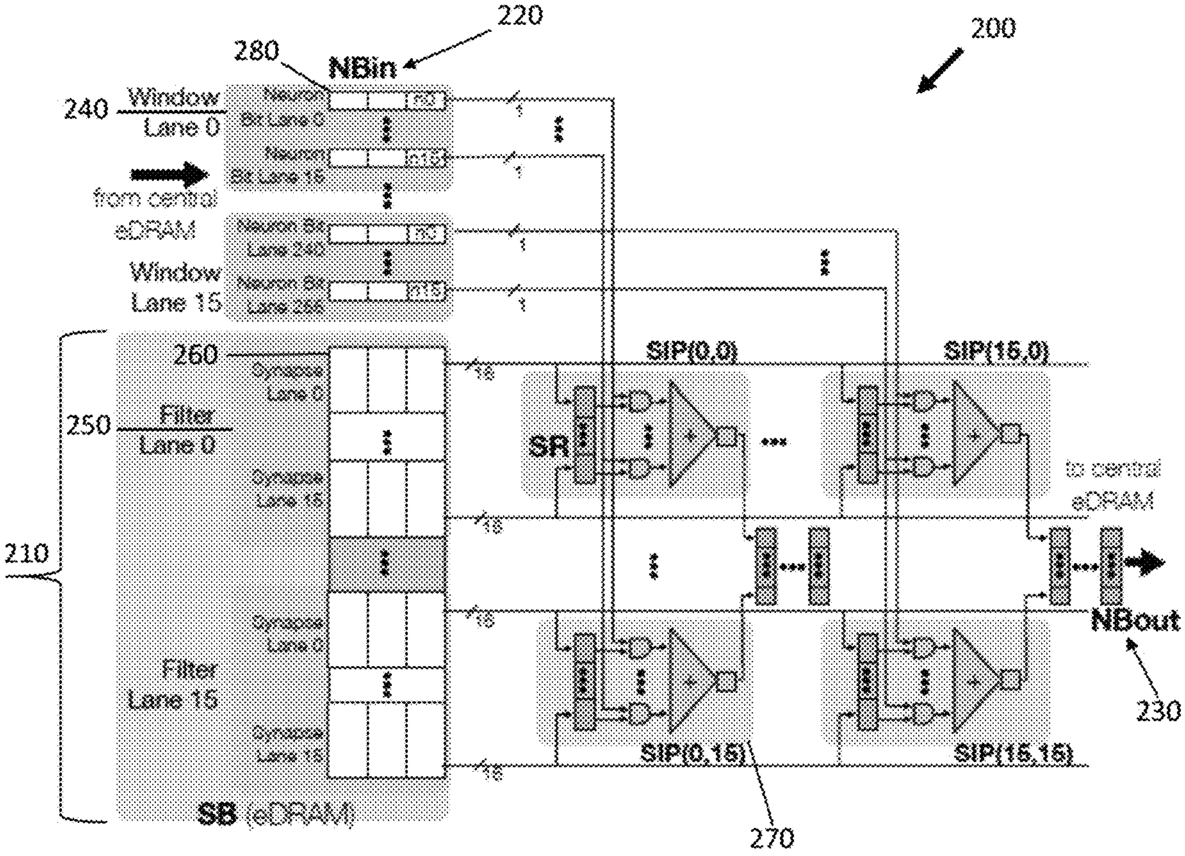
FIG. 2 is a neural processing unit according to an embodiment of the invention.

According to an embodiment, the bit serial tile 200 as shown in FIG. 2 may use an activation memory to store the firing of a neuron. It is known the terms "activation memory" and "neuron memory" as used are interchangeable in the art and literature, and the same is to be applied herein, without limitation. The activation memory may be dedicated, shared, distributed, or a combination thereof according to desired implementation of the bit seral accelerator. Thus, in one embodiment, the bit serial tile 200 may use the same NM reading and writing interconnect structures and store neurons in 16-bit containers in the NM regardless of the precision used. The bit serial accelerator may introduce a dispatcher unit to read neurons from a NM using the existing bit-parallel interface while feeding them to the NFUs bit-serially. Each bit serial tile also uses a reducer unit to store the output neurons in a NM.

According to an embodiment, since the bit serial DNN accelerator may use bit-serial computation for neurons, it may process more neurons in parallel than the bit parallel DNN such that it may maintain comparable performance when the maximum precision is used. For example, in the worst case, the bit serial DNN accelerator may use 16 cycles to calculate a product involving a 16-bit neuron. To compare to a bit parallel tile which may process a 16-neuron brick in parallel, a bit serial tile may process 16 bricks, or 256 neurons in parallel. The parallelism of convolutional layers offers a multitude of options for processing neurons in parallel.

According to an embodiment, the bit serial tile 200 as shown in FIG. 2 has the capability to process 16 windows in parallel using a neuron brick from each window so that the same 16 synapses from each of the 16 filters can be used to calculate 16×16 output neurons in parallel. For example, for a layer with a stride of 2 a bit serial tile may process 16 neuron bricks $n_B(x, y, i)$, $n_B(x+2, y, i)$ through $n_B(x+30, y, i)$ in parallel, a single bit per neuron per cycle. In this case, assuming that the bit serial tile processes filters fi though fi+15, after p cycles it would produce the following partial output neurons: $o_B(x/2, y/2, fi)$, through $o_B(x/2+15, y, fi)$, or a pallet of 16 contiguous on the x dimension output neuron bricks. Whereas a bit parallel tile 100 may process 16 neuron bricks over 16 cycles, the bit serial tile 200 may process them concurrently but bit-serially over p cycles, where p is the length or precision of neurons in bits. If p is less than 16, the bit serial tile 200 may outperform the bit parallel tile 100 by 16/p, and when p is 16, the bit serial tile ideally may match the bit parallel tile performance.

Tile Organization

According to an embodiment as shown in FIG. 2, a bit serial tile 200 may be organized as follows: the tile's NBin 220 may be logically organized in 16 window lanes 240, where each may comprise a group of 16 bit-serial neuron lanes 280 for a total of 256 neuron lanes. Each window lane 240 may process one of the 16 input neuron array windows. According to an embodiment, the SB 210 may be identical to the bit parallel tile 100 and may be logically organized in 16 filter lanes 250, where each may contain 16 synapse lanes 260. The SB 210 and NBin 220 may be in communication with or connect to an array of 16×16 Serial Inner Product (SIP) subunits 270, where each SIP 270 may produce one output neuron. The SIP(f,w) 270 at row f and column w may process filter lane f and neuron window w. The SB filter lane f may be in communication with or connect via an interconnect, for example a bus, to all SIPs 270 along row f, whereas the NBin window lane w may be in communication with or connect via an interconnect, for example, a bus to the SIPs along column w. Each SIP 270 may accept as inputs 16 neuron bits and a synapse brick which may be latched onto a synapse register (SR). The SR may support fully connected layers. While FIG. 2 (and other subsequent figures) describes the bit serial tile as hardware, the bit serial tile may be emulated in software on a processor, such as a GPU (Graphic Processing Unit) and may produce similar performance enhancements.

Figure 3:
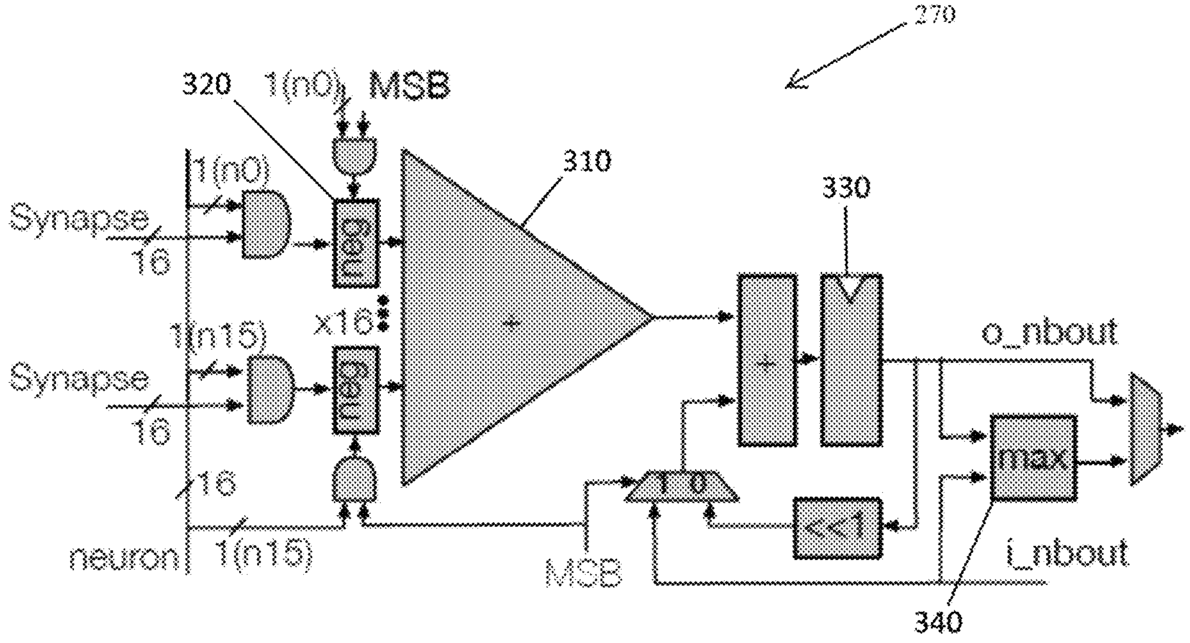
FIG. 3 is a bit serial inner product unit (SIP) according to an embodiment.

According to an embodiment, a SIP 270 is shown in FIG. 3. Each SIP 270 may contain a 17-input adder tree 310 for a total of 256 17-input adder trees whereas a bit parallel IP may use only 16 (one per IP). It may seem that would increase area considerably for a bit serial tile 200, however, each bit parallel IP 170 requires 256 2-input 16-bit multipliers, whereas a bit serial IP 270 requires none, offsetting the area increase to some degree.

According to an embodiment, processing in a bit serial tile 200 may proceed in phases of p cycles each, where p is the precision of neurons in bits. At the first cycle of a phase, SB 210 may provide 16 bricks of 16-bit synapses, one brick per filter. Each SIP 270 latches its corresponding synapse brick in its SR. Every cycle, NBin 220 may provide 256 neuron bits and each neuron bit may be bit-wise ANDed with 16 synapses, one per SIP 270 along the same column. Each AND operation may produce a 16-bit term. Thus, each SIP 270 may calculate 16 terms corresponding to one filter 250 and one window 240. The SIP 270 may sum its 16 terms into a partial output neuron using a dedicated 16-input adder tree 310. For the remaining p-1 cycles of a phase, each SIP 270 may shift its partial output neurons by one bit, while accumulating another 16 terms implementing bit-serial multiplication. After p cycles, an output neuron pallet, equal to 256 16-bit partial output neurons, may be produced in full.

Inner Product Units

In the described implementation, bit serial units 200 may produce 256 output neurons concurrently and bit-serially over multiple cycles. Each output neuron computation is an inner product. Whereas the bit parallel system 100 calculates this inner product 16 input neurons and 16 synapses at a time, the bit serial system 200 may do so differently. In the bit serial system 200, for each output neuron and at each cycle, 1 bit from each of 16 input neurons along with 16 synapses may be combined.

Multiplying neurons bit-serially is straightforward where the neuron is fed serially and the synapse is fed in parallel. Specifically, given an input neuron n of length p bits, n's binary representation is $$\sum_{b=0}^{p} n_b \times 2^b$$

Where $n_b$ is n's $b^{th}$ bit. Given a synapse s, the multiplication s×n can be rewritten as $$\sum_{b=0}^{p} 2^b \times n_b \times s$$

This leads to a circuit implementation where $n_b \times s$ is an AND, multiplication with $2^b$ is a shift and the summation is performed with an accumulator over p cycles.

To apply this naively to a bit parallel system, it may be possible to convert each of the parallel multipliers to serial ones. However, this design may be simplified by using the commutative property of addition. Formally, the terms of the inner product of the above equation may be reorganized as follows where $n_b$ the $b^{th}$ bit of n and $N_i$=16 is the size of the vectors.

$$\sum_{i=0}^{N_i-1} s_i \times n_i = \sum_{i=0}^{N_i-1} s_i \times \sum_{b=0}^{p-1} n_i^b \times 2^b = \sum_{b=0}^{p-1} 2^b \times \sum_{i=0}^{N_i-1} n_i^b \times s_i$$

In terms of logic, this shows that we may first perform the reduction on the products $$n_i^b \times s_i$$

with an adder tree, and then perform the shift and accumulate on the resulting sum. This simplifies the serial inner product unit by moving the shifted accumulator from each of the 16 inputs in the adder tree to just one on the output. FIG. 3 shows the resulting serial inner product circuit (SIP) 270. To support signed 2's complement neurons, the SIP 270 may subtract the synapse corresponding to the MSB from the serial input neuron from the partial sum when MSB is 1. This is done with negation blocks 320 for each synapse before the adder tree 310. To support inner products larger than $N_i$ data is read back from NBout 230 and may be used to initialize the accumulator 330. Each SIP 270 may also include a comparator (max) 340 to support max pooling layers.

Dispatcher

Figure 4:
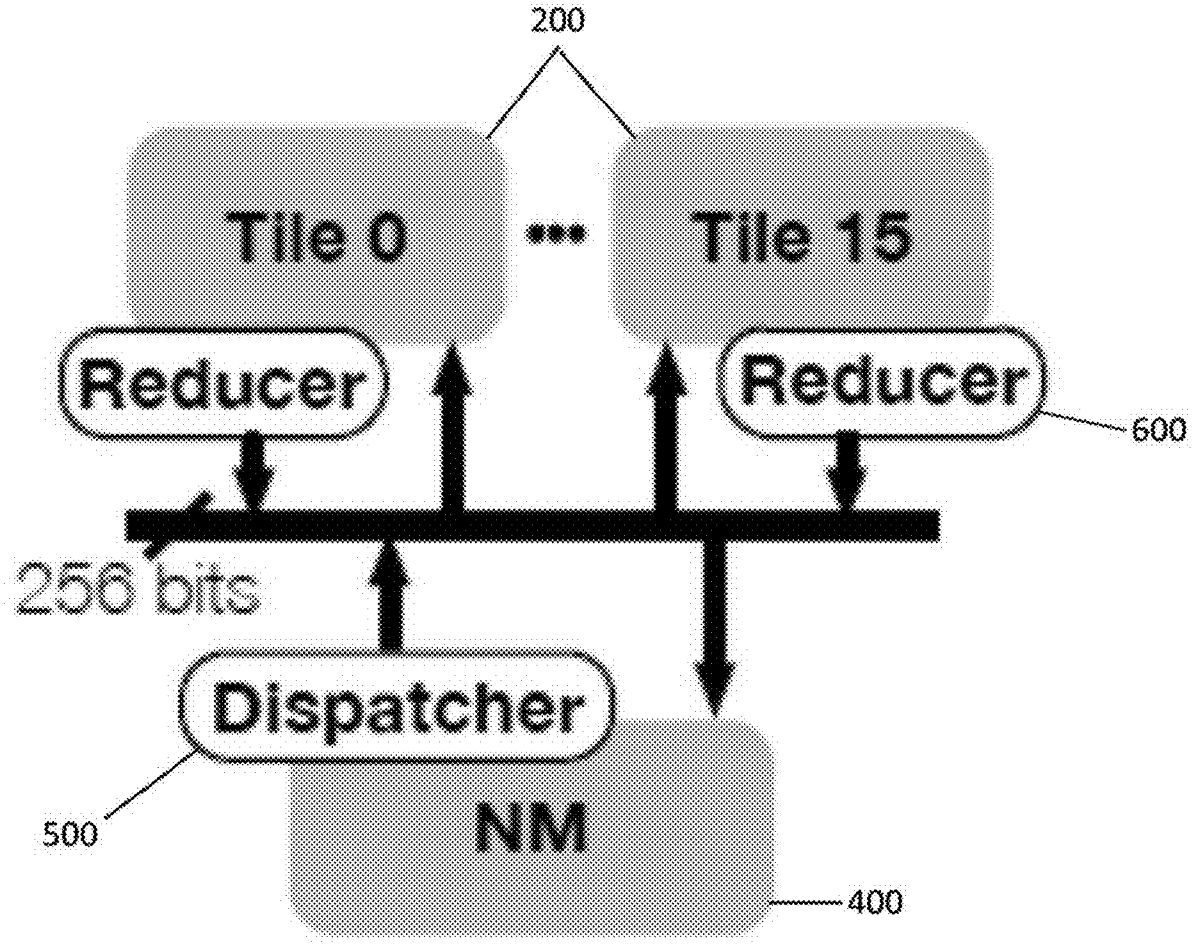
FIG. 4 is a data flow diagram of data movement between bit serial tiles and neural memory (NM) according to an embodiment.

The bit parallel system's neuron memory 400 may broadcast a brick, that is 16 16-bit neurons, or 256 bits per cycle to all tiles 200 and each tile 200 may process the same brick over different filters. The bit serial system may also broadcast 256 bits per cycle to all tiles 200 but where each bit may correspond to a different neuron. According to an embodiment, the bit serial system may maintain the same neuron storage container format in central neuron memory (NM) 400 as in a bit parallel system, aligning each neuron at a 16-bit granularity. A dispatcher unit 500 may be tasked with reading neurons from a NM 400 and feeding them to the bit serial tiles bit-serially via a first interface as shown in FIG. 4.

Reading the necessary neurons from a NM 400 may be best understood by first considering a layer using a unit stride. In this case, at each cycle, the bit serial units may be fed with bits from 16 contiguous along the x dimension bricks: $n_B(x, y, i)$), $n_B(x+1, y, i)$ through $n_B(x+15, y, i)$. Provided that these 16 neuron slices may be read in parallel, the dispatcher 500 may feed them bit serially over the next p cycles. To enable reading the 16 bricks in parallel the bit serial system may map them on consecutive locations in the NM 400. In many cases, this may result in the 16 bricks being stored onto the same NM row. In this case, the dispatcher 500 may read them all in a single cycle (given that the 2 MB NM comprises several subarrays, reading 256 neurons in parallel is feasible).

Depending on the input neuron array y dimension, as well as the stride, the 16 bricks may spread over two NM rows (this is similar to reading a misaligned block from a data cache). In this case, the dispatcher 500 may have to read and combine the appropriate bricks from up to two rows over two cycles before it can feed the bit serial tiles 200. As long as p is at least 2, the next set of 16 bricks may not be needed until p cycles have elapsed. Accordingly, the whole process may be pipelined and thus the bit serial system can be kept busy most all of the time.

Figure 6:
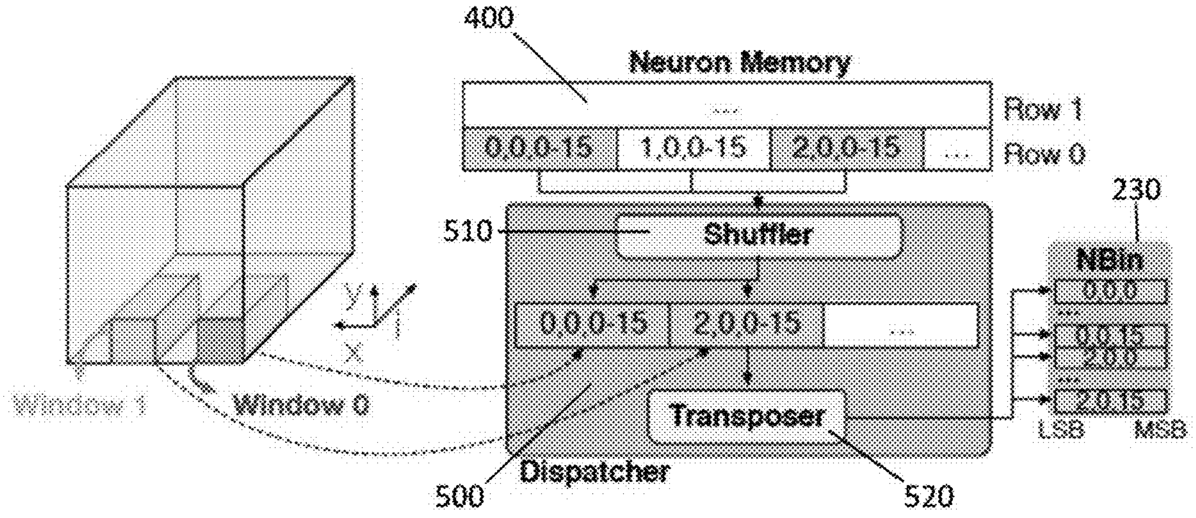
FIG. 6 is a data flow diagram of a neuron memory mapping according to an embodiment.

According to an embodiment, FIG. 6 shows an example with two windows and stride of 2. When the stride S is more than one, the 16 bricks could be spread over R=min[S+1, 16] rows. Accordingly, the dispatcher 500 may read R rows over R cycles before feeding the next set of 256 neurons to the tiles. As long as R is less then p there is enough time to keep the units busy all the time. When R is more than p the units may stall for R-p cycles. It may be possible to reduce the number of rows that the dispatcher 500 may read by mapping bricks to the NM 400 taking into account the stride.

Figure 5:
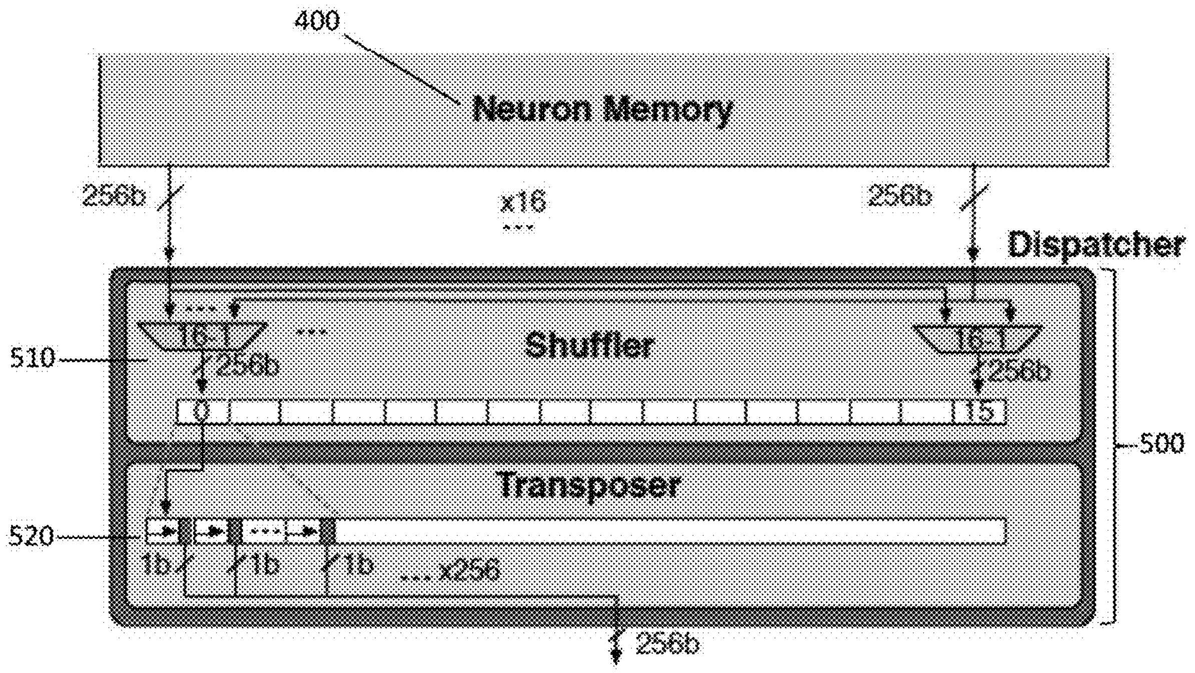
FIG. 5 is a dispatcher according to an embodiment.

As described above, given a layer stride S, the dispatcher may read up to max[S+1, 16] rows, one per cycle to collect 16 bricks. Given these 16 bricks, the dispatcher 500 may then send one bit from each of the 256 neurons they contain, for a total 256 bits per cycle, over p cycles to the bit serial tiles 200. According to an embodiment as shown in FIG. 5, the dispatcher 500 may be composed of two parts: a shuffler 510 and a transposer 520. The shuffler 510 may read 16 bricks from the NM and the transposer 520 may communicate them bit-serially to the tiles 200. The dispatcher 500 may communicate a new set of 16 bricks every p cycles.

According to an embodiment as shown in FIG. 5, the shuffler 510 may collect the 16 bricks to keep the bit serial units busy over p cycles. The collection of the next group of 16 bricks may be overlapped with the processing of the current group. Hence the shuffler 510 may collect a 16-brick group every p cycles. Each cycle, the shuffler 510 may read a row of 256 neurons from the NM 400. As bricks may be stored contiguously in the NM 400, every row may contain 16 bricks. However, all of these bricks may not be needed at a given time. A 16-to-1 multiplexer per output brick may be sufficient to select the appropriate brick when that appears on the input row. Accordingly, the shuffler 510 may comprise 16 16-to-1 256-bit (one brick of 16 neuron 16-bit containers) multiplexers. The input neurons may be collected on 256 16-bit registers organized in groups of 16, one per input brick. Once the shuffler 510 has collected all 16 bricks, it may transfer them to the input registers of the transposer 520.

According to an embodiment as shown in FIG. 5, the transposer 520 may convert the neurons read from memory by the shuffler to serial bit streams. Once the shuffler 510 has collected all 16 bricks, it may write them bit-parallel into 256 16-bit registers. Each register provides a 16-bit bit-parallel write port, and a single-bit bit-serial read port. Over the next p cycles, the transposer 520 outputs one bit per neuron for a total of 256 bits per cycle. These are broadcast to all NFUs using the interconnect, similar to a bit parallel system.

Reducer

According to an embodiment, the bit serial system's NFUs may produce output neurons in 16-bit fixed-point format. The reducer units 600 may serve a dual purpose: 1) convert to the precision used by the output layer, and 2) write the output neuron bricks to the NM via a third interface. According to an embodiment, writing the output neurons back to the NM via a third interface (which may be the same interface as the first interface) may use the same interface or interconnect as in a bit parallel system. The difference is that as a bit serial system outperforms a bit parallel system, it may exhibit higher output neuron bandwidth demand. Fortunately, since calculating an output neuron involves processing a full input neuron window, there is enough time to meet this demand with the exiting interconnect. For example, while a bit parallel system may produces a single output neuron brick, or 16 output neurons concurrently (e.g., $o_B(x, y, fi)$), the bit serial system may produce a pallet of 256 output neurons comprising 16 bricks contiguous along the x dimension, (e.g., $o_B(x, y, fi)$) through $o_B(x+15, y, fi)$). This pallet may be stored contiguously in the NM address space as may be expected by the dispatcher when processing the next layer. The bit serial tiles may send a single brick at a time as in the baseline and take multiple cycles to write all 16. Since the tiles may write a single brick per cycle, and since bricks may not span a NM row, supporting misaligned brick writes may not be needed.

Where a bit serial system may outperform a bit parallel system its computational throughput is increased by 16/p. If a layer is relatively small, it is in principle possible to need extra cycles to drain all output neurons. However, even in the baseline output neurons typically may take hundreds of cycles to be computed as producing an output neuron may involve processing a full input neuron window. Accordingly, there may be sufficient time to write the output bricks.

According to an embodiment, the neurons may be stored in NM in bit-interleaved fashion. Rather than reading 256 full neurons in one access and then transposing them to a bit serial form, 256 bits of neurons may be read using the bit-parallel interface where these are bit 0 of the 256 neurons. In the next cycle, we may read bit 1 of all 256 neurons and then it continues to the next bit. In this case, the reducer would do the appropriate conversion.

Execution for Fully Connected Layers

A bit parallel system may compute fully connected (FC) layers as a convolution layer where the filter dimensions match that of the input neuron array. In this case, there may be only one window with a different data access and execution schedule to match a bit parallel system's performance. When processing a convolutional layer, the synapses may be read via a second interface only once every p cycles. To process an FC layer, the bit serial unit may load synapses in a round-robin fashion one SIP column per cycle via the single SB read port and bus, keeping all SIPs busy processing neurons. For example, with reference to FIG. 3, a unit can load 256 synapses to SIP(0,0) . . . SIP(0,15) in cycle 0, then load the next 256 synapses to SIP(1,0) . . . SIP(1,15) in cycle 1, etc. The loading of synapses may be overlapped with processing neurons by staggering the neuron stream to synchronize with the loading of synapses.

This mode of operation (round robin synapse loading and staggered neurons streams) may require modification to the control. Table 1 (immediately below) shows an example, illustrating how synapse loading and computation is overlapped for processing the first 17 cycles.

TABLE 1

| |
|---|
| Cycle 0: |
| SIP(0,0)...SIP(0,15): latch $s_B^0(0, 0, 0)$, ..., $s_B^{15}(0, 0, 0)$ |
| via window lane 0: receive bit 0 of $n_B(0, 0, 0)$ |
| Cycle 1: |
| SIP(0,0)...SIP(0,15): |
| via window lane 0: receive bit 1 of $n_B(0, 0, 0)$ |
| SIP(1,0)...SIP(1,15): latch $s_B^0(1, 0, 0)$, ..., $s_B^{15}(1, 0, 0)$ |
| via window lane 1: receive bit 0 of $n_B(1, 0, 0)$ |
| ... |
| Cycle 15: Fully Utilized |
| SIP(0,0)...SIP(0,15): |
| via window lane 0: receive bit 15 of $n_B(0, 0, 0)$ |
| SIP(1,0)...SIP(1,15): |
| via window lane 1: receive bit 14 of $n_B(1, 0, 0)$ |
| ... |
| SIP(15,0)...SIP(15,15): latch $s_B^0(15, 0, 0)$, ..., $s_B^{15}(15, 0, 0)$ |
| via window lane 15: receive bit 0 of $n_B(15, 0, 0)$ |
| Cycle 16: Fully Utilized |
| SIP(0,0)...SIP(0,15): latch $s_B^0(0, 0, 16)$, ..., $s_B^{15}(0, 0, 16)$ |
| via window lane 0: receive bit 0 of $n_B(0, 0, 16)$ |
| ... |
| SIP(15,0)...SIP(15,15): |
| via window lane 15: receive bit 1 of $n_B(15, 0, 0)$ |

This approach may improve performance for FC layers when batching is used, a common strategy when synapse bandwidth becomes a bottleneck. Batching computes each layer over multiple images at a time, so that synapses may be reused for neurons from different images. In this case, each synapse loaded to a SIP may be used for p×b cycles, where b is the batch size.

While there may or may not be performance improvement over a bit parallel system when processing a single image, using a shorter precision in bit serial FC layers may reduce energy by avoiding computations on each SIP column for 16-p cycles of every 16 cycles. Alternatively, only p SIP columns could be used in the case and the other SIPs would save power by not toggling or could be turned off completely with power gating. Experimental results showed a small overhead from staggering the neuron streams, which averaged 0.16% of the layer runtime. The potential for further improving performance by accelerating FC layers is likely very small since they account for a small fraction of the overall execution time. Furthermore, the current trend in DNNs is for reducing or eliminating the number of FC layers.

Pooling Layers

For pooling layers, neurons are transmitted bit-parallel from NM and bypass the adder tree in the SIPs. The dispatcher is designed to broadcast serial data at 256 bits/cycle whereas pooling layers read 4096 bits/cycle as neurons are distributed across tiles. Max pooling is supported with comparators in the SIPs. Average pooling is supported by accumulating neurons in the SIPs and using the activation unit to scale the result. Local response normalization layers use the inner product units due to the limited bandwidth of the dispatcher, and may not be serialized while matching the baseline performance.

Communicating the Per Layer Precisions

This embodiment assumes that the per layer precisions may be pre-calculated and provided along with the network's other metadata such as the dimensions, padding and stride of each layer. Several complete profiles of per layer precisions may be supplied by the DNN to enable accuracy vs. performance tradeoffs at run-time. This metadata information may be read by the bit serial controller and may be used to control the operation of the units, the dispatcher and the reducers.

Determining Per Neuron Group Precisions at Runtime

According to another embodiment the precision p is dynamically adjusted for each group of 256 neurons processed concurrently. This determination is performed by the transposer prior to communicating the neurons to the units for processing. For each of the 256 neurons to be sent to the units, $n_i$ where i=0 . . . 255, the transposer uses a leading bit that is a 1 detector to determine $n_i^H$ the highest bit position where a bit that is 1 appears. Similarly, the transposer uses a trailing bit that is a 1 detector to determine $n_i^L$ the lowest bit position where a bit that is 1 appears. The precision p for this set of neurons is effectively set to: $\max_{i=0 \ldots 255}\{n_i^H\}-\min_{i=0 \ldots 255}\{n_i^L\}$. To process these neurons, the transposer sends along with the bits also their offset via a set of extra 4 wires. An additional wire indicates the end of processing a neuron group. Accordingly, it is not necessary to calculate the precision explicitly. There is a variety of leading or trailing bit 1 detector circuits that are well understood by practitioners.

Comparison to Bit Parallel Tiles

Since the convolutional layers are highly parallel, improving a bit parallel system's performance has been proposed by exploiting parallelism by adding more tiles. As shown in the subsequent example, the bit serial system may increase tile area by up to 24%. Assuming ideal performance scaling, we could, for comparison, use this extra area to introduce an additional 24% more tiles in a bit parallel system. In reality, ideal scaling may not be possible as it may not be possible to keep all neuron lanes busy. For example, a bit parallel chip can be fully utilized only as long as there are multiples of 256 filters in a layer (16 filters in each of the 16 tiles). As a result, depending on the layer, there are cases where units are underutilized and having more units will make such cases more common.

Even taking the best possible assumption that bit parallel performance may be scaled by 24% with the same area overhead as bit serial, the example shows that bit serial may still outperform this alternative and thus may offer better area vs. performance scaling. Furthermore, the bit serial approach may enable static or run-time performance vs. accuracy tradeoffs which may not be possible with the bit parallel design.

Comparison to Decomposable Processing Units

A common current approach to gaining performance from reduced precision is to use decomposable multipliers and adders. For example, a 16-bit adder may easily be configured as two 8-bit adders with minimal overhead. This approach is commonly used in multimedia instruction set extensions of general purpose processors. Since this does not increase latency of each operation it may be used to increase computational throughput.

When considering the characteristics of neural networks, decomposable units have three constraints that disadvantage them: 1) decomposable units are typically constrained to power-of-2 precisions, meaning they cannot yield all of the potential benefit of variable reduced precision. For example, a layer requiring only 9 bits would use 16 bits ($2^4$), 2) decomposable units require both inputs to be the same width. In the case of neural networks these are the weights and the neurons, and the weights typically require more than 8 bits and as a result many layers may not see improvement, 3) finally, if the baseline multipliers and adder trees were decomposable, the largest precision of the data and weights may have to be chosen for each layer. The examples demonstrate that bit serial may outperform an idealized decomposable unit based bit parallel design.

Examples

This section describes the per-layer precision profile exploration strategy and the experimental methodology. For, numerical representation requirements analysis, the best per layer precision profiles are found via the methodology of Judd et al. [P. Judd, J. Albericio, T. Hetherington, T. Aamodt, N. E. Jerger, R. Urtasun, and A. Moshovos, "Reduced-Precision Strategies for Bounded Memory in Deep Neural Nets, arXiv:1511.05236v4 [cs.LG]," arXiv.org, 2015]. Caffe was used to measure how reducing the precision of each convolution layer affects the network's overall top-1 prediction accuracy over 5000 images, that is, how often the network correctly classifies the input. The network definitions and pretrained synaptic weights are taken from the Caffe Model Zoo.

While Judd et al., considered fixed point numbers as having I≥0 integer and F≥0 fractional bits, this example drops some of the less significant integer bits by parameterizing numbers as the MSB bit position, M, relative to the binary point, and the number of bits, N. This is an exponential search space problem with M, N ∈ [0, 16] per layer and multiple layers. The heuristic search space pruning approach was: 1) find the best per layer M profile using gradient descent, iteratively decreasing M by one bit, one layer at a time; and 2) given a fixed M-profile, explore the space of N-profiles, again using gradient descent. In both steps per layer analysis is used to determine a good starting point.

Table 2 (immediately below) lists the per convolutional layer neuron precision profiles needed to maintain the same accuracy as in the baseline (100%) and to reduce it within 1% of the baseline (99%). Cnv: fraction of execution time taken by convolutional layers in the baseline system. Ideal: Potential speedup with bit serial DNN.

TABLE 2

| | Overall | Relative Accuracy | | | |
|---|---|---|---|---|---|
| | Time in | 100% | | 99% | |
| Network | Conv. Layers | Per Layer Neuron Precision in Bits | Ideal Speedup | Per Layer Neuron Precision in Bits | Ideal Speedup |
| LeNet | 96% | 3-3 | 5.33 | 2-3 | 7.33 |
| Convnet | 97% | 4-8-8 | 2.89 | 4-5-7 | 3.53 |
| AlexNet | 97% | 9-8-5-5-7 | 2.38 | 9-7-4-5-7 | 2.58 |
| NiN | 99% | 8-8-8-9-7-8-8-9-9-8-8-8 | 1.91 | 8-8-7-9-8-8-9-9-8-7-8 | 1.93 |
| GoogLeNet | 98% | 10-8-10-9-8-10-9-8-9-10-7 | 1.76 | 10-8-9-8-8-9-10-8-9-10-8 | 1.80 |
| VGG_M | 96% | 7-7-7-8-7 | 2.23 | 6-8-7-7-7 | 2.34 |
| VGG_S | 97% | 7-8-9-7-9 | 2.04 | 7-8-9-7-9 | 2.04 |
| VGG_19 | 99% | 12-12-12-11-12-10-11-11-13-12-13-13-13-13-13-13 | 1.35 | 9-9-9-8-12-10-10-12-13-11-12-13-13-13-13-13 | 1.57 |

For performance, area and energy, both the bit parallel and bit serial systems were modelled using the same methodology for consistency. A custom cycle-accurate simulator models execution time. Computation was scheduled as described by Chen et al. Power and area were extracted from synthesized Verilog implementations via the Synopsis Design Compiler and the TSMC 65 nm library. The NBin and NBout SRAM buffers were modelled using CACTI. The eDRAM area and energy were modelled with Destiny. Both Single and Batch (each layer computed concurrently for multiple images) runs are performed. The batch size is chosen to avoid spilling neurons off-chip that would otherwise severely penalize performance and energy. Measurements are made over the full network execution.

Performance Measurement

Figure 7:
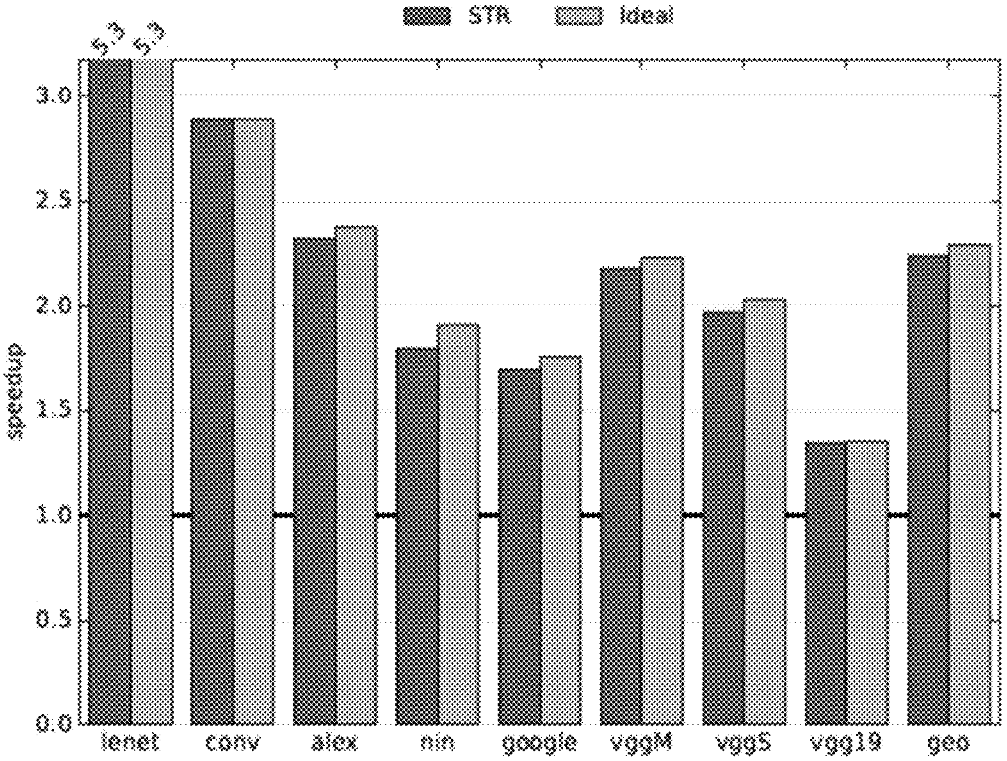
FIG. 7 is a bar graph of experimental speedup results of an embodiment of the invention.

FIG. 7 reports the bit serial performance relative to bit parallel for the precision profiles in Table 2. Since batch processing does not impact performance in either bit parallel or bit serial, the reported results are applicable to both. For the 100% profile, where no accuracy is lost, on average the bit serial yields a speedup of 2.24× over bit parallel. In the best case, LeNet, which requires only 3 bits of precision in each layer, the speedup is 5.33×, whereas NiN and VGG19 exhibit the least speedup, 1.8× and 1.35× respectively, mostly due to their high precision requirements. In general, performance improvements follow the reduction in precision and are in line with the ideal speedup in Table 2. The differences are due to the neuron lane under-utilization, which in the worst case is 7% (NiN). On average bit serial achieves a speedup that is within 2% of the ideal.

Area Overhead

Over the full chip, bit serial requires 22% more area than bit parallel out of which 1% is for the dispatcher. Considering each tile alone, taking into account the 16× increase in NBout entries, the reducer, and the SIPs, bit serial increases area by 24%. While the 256 SIPs per tile in bit serial increase area by 139% compared to bit parallel combination of 256 multipliers and 16 adder trees alone, the SB dominates tile area resulting in the much lower per tile and overall chip area overhead.

Energy Efficiency Measurement

Figure 8:
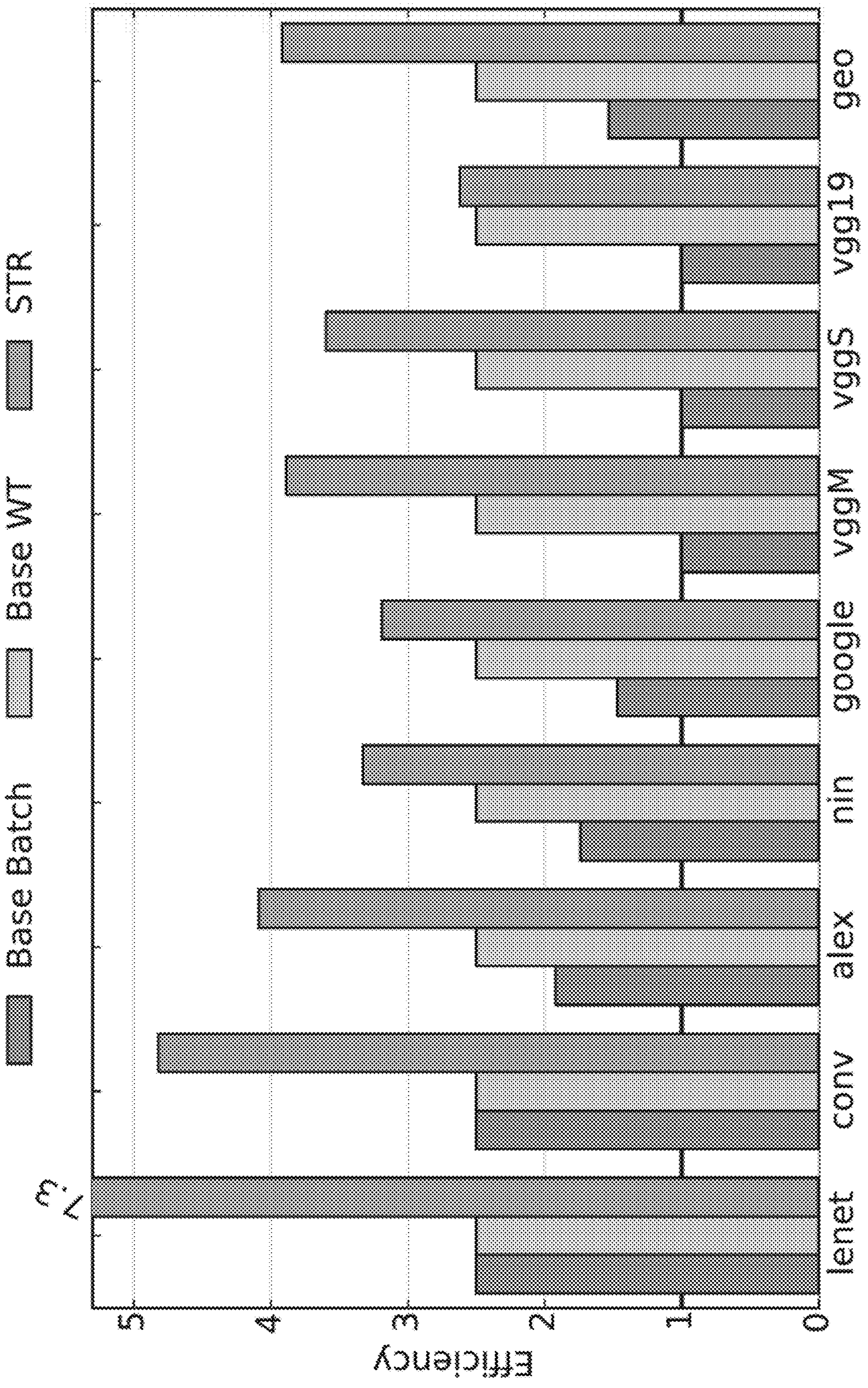
FIG. 8 is a bar graph of experimental energy efficiency results of an embodiment of the invention.

FIG. 8 compares the energy efficiency of bit serial and bit parallel under single and batch mode. Energy efficiency, or simply efficiency for a system new relative to base is defined as the ratio Ebase/Enew of the energy required by base to complete a full network run over that of new. To facilitate direct comparisons across all cases we use the energy of bit parallel in single mode as the numerator in all efficiency measurements reported in FIG. 8.

Focusing on single mode, the average efficiency improvement with bit serial across all networks for the 100% profiles is 3×, ranging from 6× in the best case (LeNet) to 1.92× in the worst case (VGG19). Ignoring secondary overheads, efficiency primarily depends on the reduction in precision length per layer since the energy savings are primarily derived from processing fewer neuron bits. Secondarily, the energy savings come from reducing the number of SB accesses which in bit serial occur only every p cycles. Motivated by the reuse of synapses over multiple windows in bit serial, we evaluated an improved processing schedule for bit parallel that interleaves the processing of multiple windows similar to bit serial. The "BASE WT" bars report the energy efficiency of this window tiling approach which proves more efficient than the originally suggested schedule, but is still less efficient than bit serial.

Batching improves energy efficiency for both bit parallel and bit serial as synapses are reused over multiple images and thus SB reads are less frequent. However, the benefits from processing fewer neuron bits in bit serial far exceed those from synapse reuse. The average energy efficiency for bit serial in batch mode is 3.19× whereas bit parallel is still less efficient than bit serial with an efficiency of 1.4× over its single mode. Window tiling in the bit parallel improves efficiency by 2.03×. Since window tiling is not restricted by the size of NM, it allows for larger energy savings compared to batching in bit parallel.

Accuracy vs. Performance

In some embodiments, the bit serial DNN may further enable static and on-the-fly energy, performance, and accuracy tradeoffs. For example, by reducing precision, an application may choose to reduce accuracy in exchange for improved performance and energy efficiency. This capability would be useful, for example: 1) on a battery-operated device where a user or the operating system may opt for slightly reduced accuracy in exchange for longer up time, or 2) under strict time constraints where an application may opt for a less accurate but timely response.

This example considers an approximate computing approach to improve performance by lowering precisions to the point where they start affecting overall network accuracy. By using serial computation and per layer neuron precisions bit serial enables the ability to fine-tune the accuracy and performance tradeoff. Since performance does not depend on whether batching or single mode is used, the results in the remaining sections are applicable to either processing mode.

Figure 9:
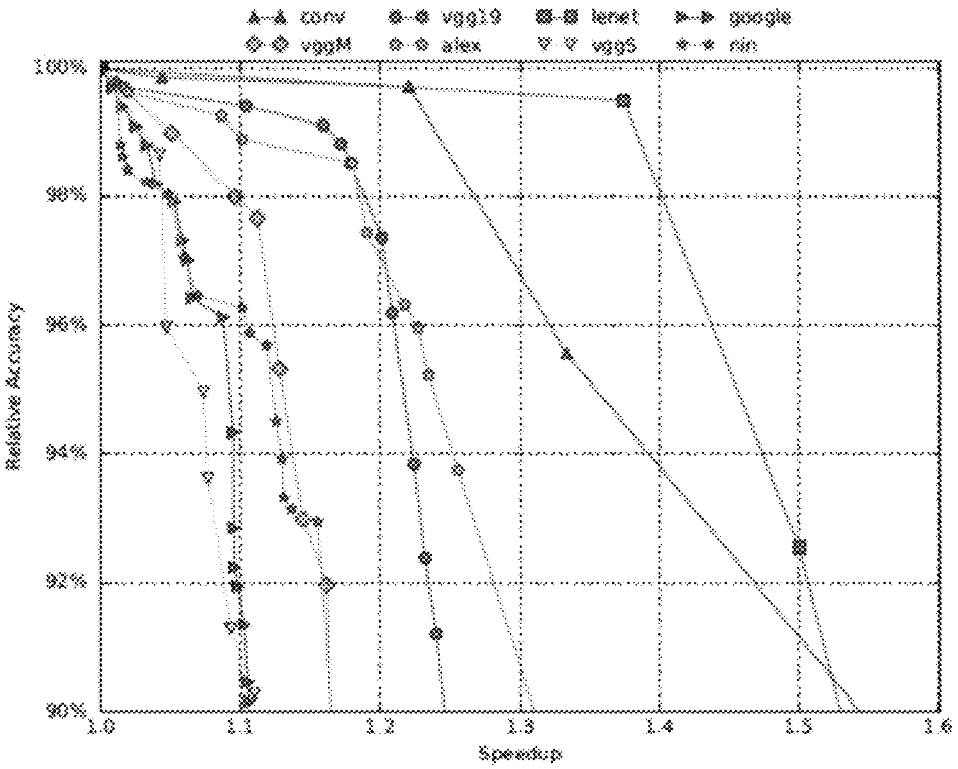
FIG. 9 is line graph of performance vs. accuracy experimental results of an embodiment of the invention.

FIG. 9 shows the tradeoff between network accuracy and speedup. The graph plots performance relative to the 100% configuration of FIG. 7 to show the performance vs. accuracy trade off more clearly than normalizing over bit parallel. Each point in the graph corresponds to a precision profile on the Pareto frontier of accuracy vs. performance. Attention is limited to profiles above 90% accuracy relative to the baseline, since accuracy drops off quickly below 90%. In all cases, additional performance improvements are possible with reduced accuracy, and the networks exhibit a knee in the accuracy vs. performance curve past which they incur rapid performance losses. The rest of this section, below, focuses on the performance improvement possible when an up to 1% accuracy loss is acceptable.

Figure 10:
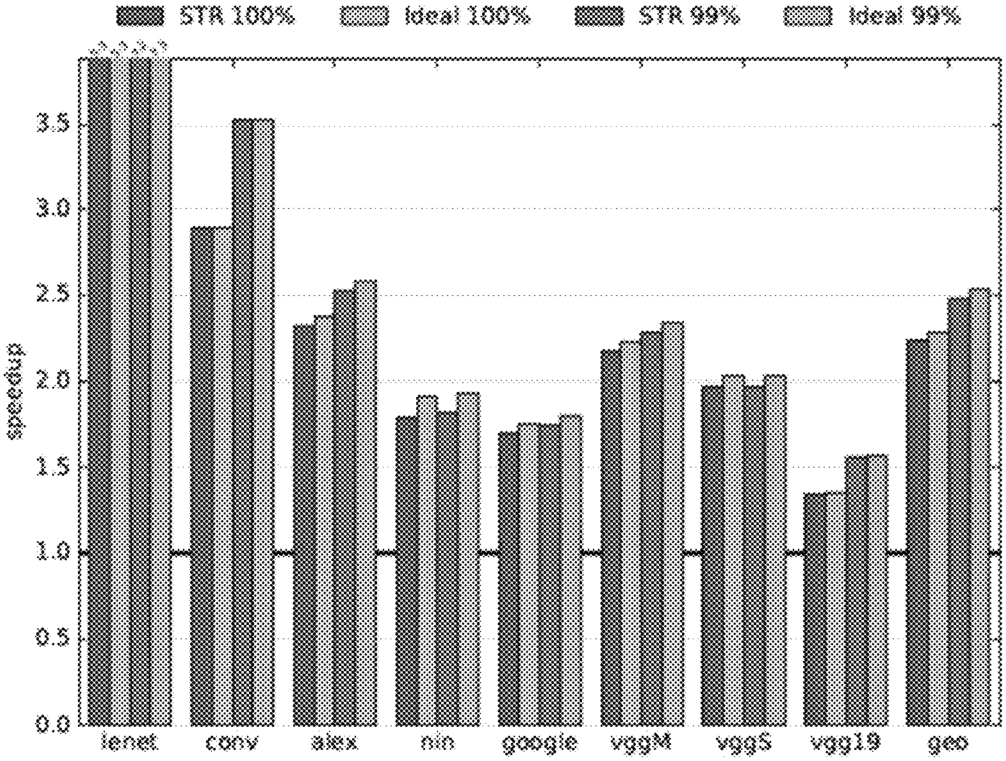
FIG. 10 is a bar graph of performance experimental results of an embodiment of the invention.

FIG. 10 shows the speedup of the 99% precision profiles from Table 2 relative to bit parallel. By tolerating up to 1% relative prediction error, the average speedup increases to 2.48×, an incremental speedup of 11%. Speedups for the individual networks range from 1.56× for VGG19 to 7.23× for LeNet and generally follow the reduction in precision lengths. NiN benefits the most as it is able to use much smaller precisions in each layer when the accuracy constraint is loosened. Compare to FIG. 8 shows the efficiency for the 99% precision profiles. On average, efficiency increases to 3.24×.

With the 99% profile for LeNet, bit serial encounters the only instance of dispatcher stalls. In this case, the precision of the first layer is 2 bits, thus the buffer is drained in 2 cycles. For some sets of window data in NM the dispatcher needs more than 2 cycles to read the data, causing the dispatcher to stall. However, this situation is uncommon and only causes stalls for 2% of the total runtime. In all other cases bit serial is able to dispatch serial data continuously.

Decomposable Compute Units

This compares bit serial to an ideal decomposable variance of bit parallel, as described above and which supports all power of 2 representation lengths up to 16. For this comparison, it is assumed that the NFU utilization is the same for all precisions in bit parallel, e.g., a layer that performs 256 multiplications at 16 bits will perform 512 multiplications at 8 bits. In practice utilization will be worse for some layers due to the alignment constraints imposed by bit parallel.

Figure 11:
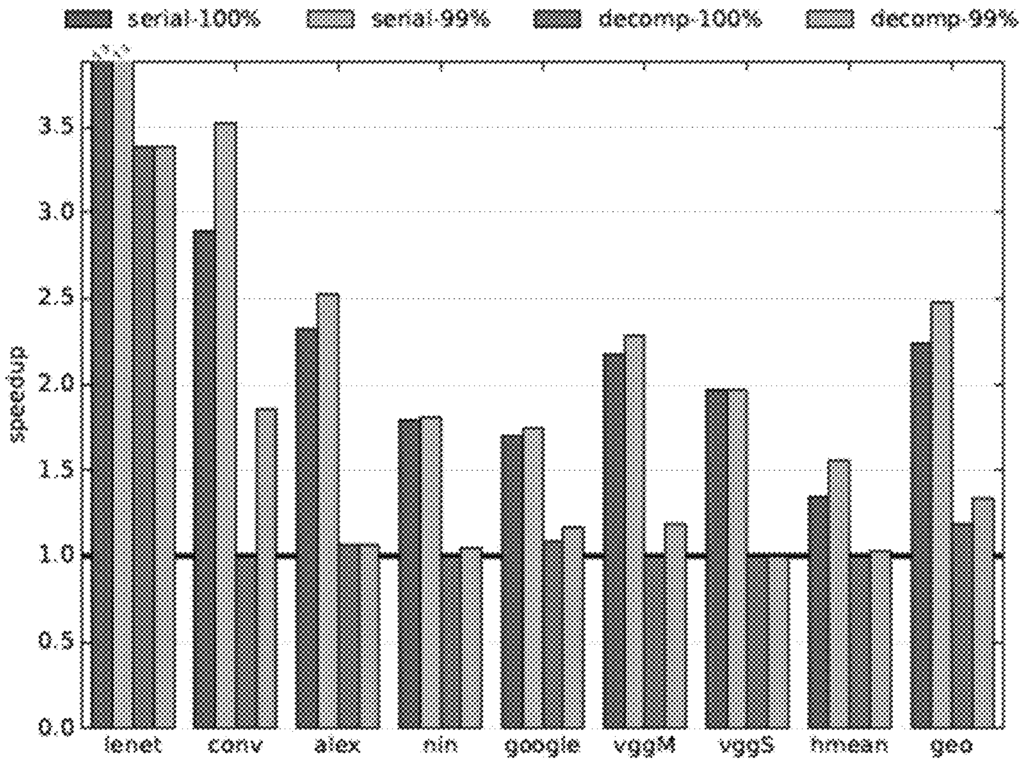
FIG. 11 is a bar graph of performance experimental results of an embodiment of the invention.

FIG. 11 compares the speedup achieved by bit serial and the ideal bit parallel. With no accuracy loss bit parallel achieves 1.13× speedup vs. 1.99× for bit serial on average, while when an up to 1% accuracy loss is allowed bit parallel average speedup is 1.27× vs. 2.18× for bit serial. Bit parallel is also limited to profiles where the precision of each layer is a power of two and the same for both neurons and synapses. The size constraints of bit parallel severely limit its performance benefits compared to bit serial even under ideal assumptions.

Alternate Processing of Fully Connected Layers

In another embodiment, it is possible to improve performance and energy efficiency while processing not only convolutional layers but also fully connected layers but at an additional cost in area.

Figure 12:
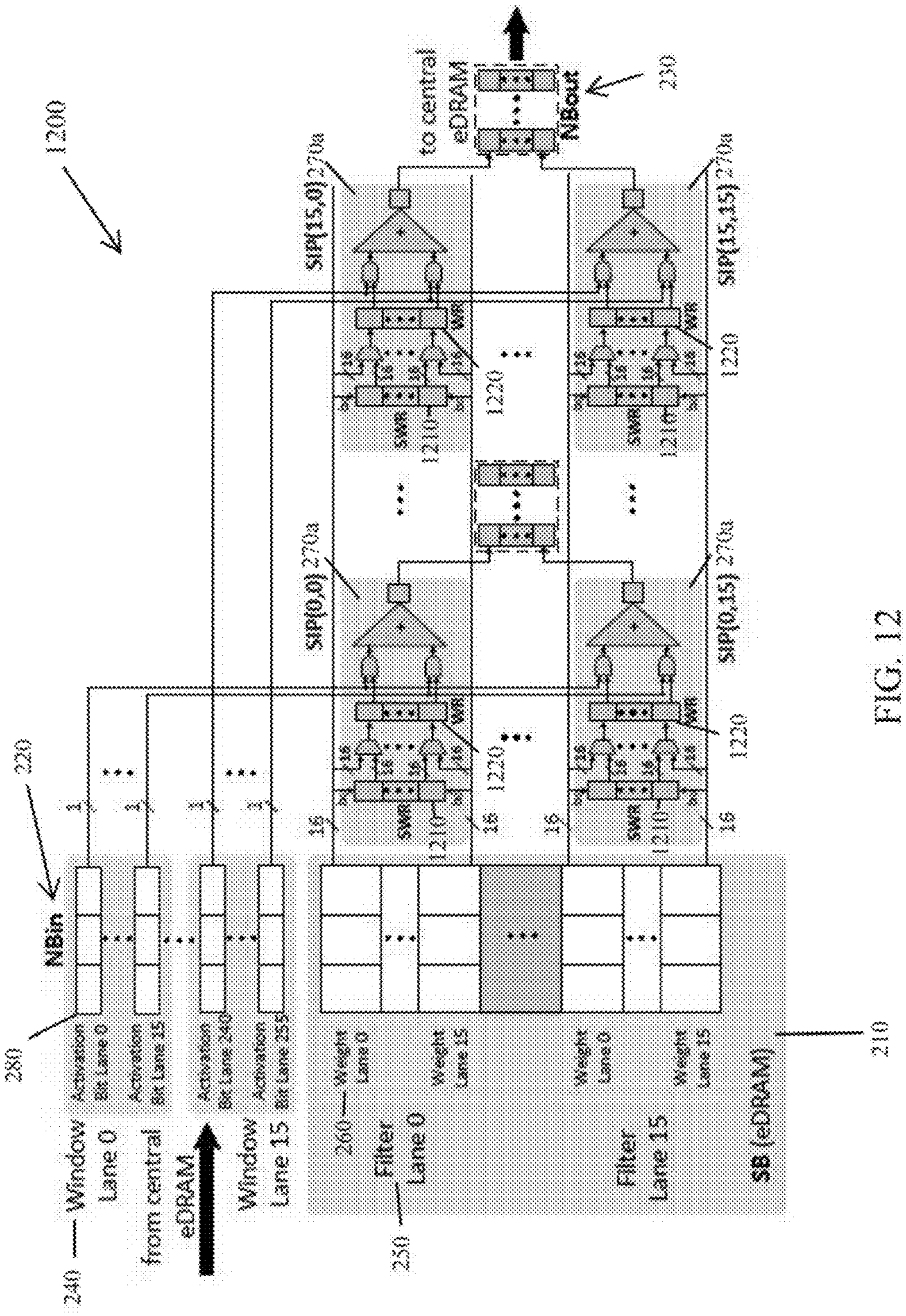
FIG. 12 is a neural processing unit or tile according to an embodiment of the invention.

In this embodiment, each SIP 270*a* in tile 1200 is now augmented with an additional Serial Weight Register, SWR 1210, which is a vector of 16 16-bit subregisters as shown in FIG. 12. Since the SIPs 270*a* maintain the existing registers, referred to as the Weight Register, WR 1220, processing of convolutional layers proceeds as before. The SWRs 1210 enable the processing of fully connected layers in max(Ps,Pa) cycles per group of concurrently processed synapses and neurons where Ps and Pa the precisions of synapses and activations respectively. Accordingly, the performance improvement compared to a 16-bit bit-parallel engine is 16/max(Ps,Pa). In the original design, the SIPs 270 along the same row all share the same 256 wires, allowing the parallel loading of the same set of 16 16-bit weights to all 16 WRs. In this embodiment, each of the 256 wires is connected to one of the 16×16 SWR subregisters. Accordingly, every cycle, a different bit can be loaded to each of the 16×16=256 SWR subregisters. Over Ps cycles, a different synapse of Ps bits can be loaded to the 256 SWR subregisters. These 256 synapse values can then be parallel loaded to the corresponding WR subregisters and then processed with the corresponding neurons bit-serially as before. This embodiment thus uses a three-step pipeline, where first the weights are bit-serially loaded into the SWRs 1210, then parallel loaded to the WRs 1220, and then bit-serially multiplied with the neurons.

Figure 13:
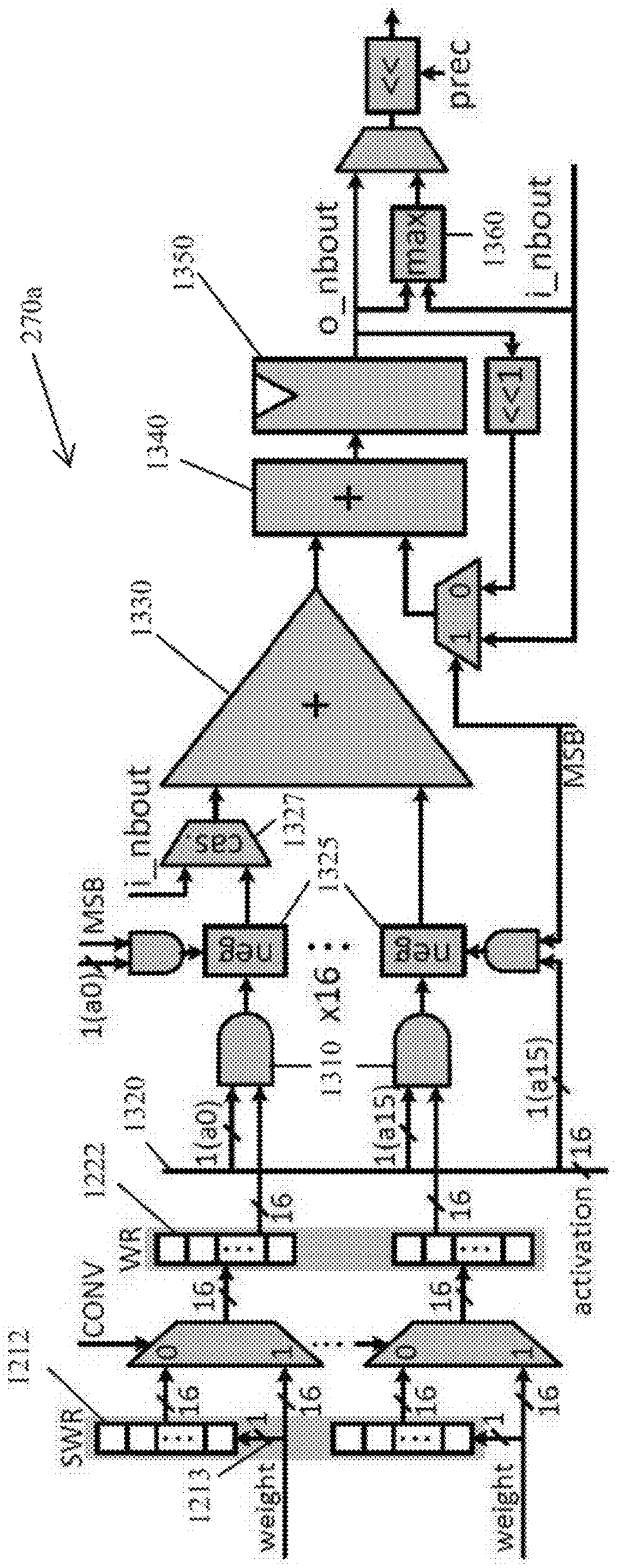
FIG. 13 is a bit serial inner product unit (SIP) according to an embodiment of the invention.

FIG. 13 shows an example SIP 270*a* for this embodiment. Each SIP 270*a* multiplies 16 activation bits, one bit per activation, by 16 weights to produce an output activation. Each SIP 270*a* has two registers, a SWR 1210 and a WR 1220, each containing 16 16-bit subregisters. Each SWR subregister 1212 is a shift register with a single bit connection 1213 to one of the weight bus wires that is used to read weights bit-serially for a fully-connected layer. Each WR subregister 2222 can be parallel loaded from either the weight bus or the corresponding SWR subregister 1212 to process convolutional layers or fully-connected layers respectively. Each SIP 270*a* includes 256 2-input AND gates 1310 that multiply the weights in the WR 1220 with the incoming activation bits 1320, and a 16×16 bit adder tree 1330 that sums the partial products. A final adder 1340 plus a shifter 1350 accumulate the adder tree results into the output register OR.

In each SIP 270*a*, a multiplexer 1327 at the first input of the adder tree 1330 implements the cascade mode supporting slicing the output activation computation along the SIPs of a single row. To support signed 2's complement neurons, the SIP 270*a* can subtract the weight corresponding to the most significant bit (MSB) from the partial sum when the MSB is 1. This is done with negation blocks 1325 for each weight before the adder tree. Each SIP 270*a* also includes a comparator (max) 1360 to support max pooling layers.

The following example illustrates at a high-level the way the embodiment operates by showing how it would process two purposely trivial cases: 1) a fully-connected layer with a single input activation producing two output activations, and 2) a convolutional layer with two input activations and one single-weight filter producing two output activations. The per layer calculations are:

| Fully Connected: | Convolutional: |
|---|---|
| f1 = w1 × a<br>f2 = w2 × a | c1 = w × a1<br>c2 = w × a2 |

Where f1, f2, c1 and c2 are output activations, w1, w2, and w are weights, and a1, a2 and a are input activations. For clarity, all values are assumed to be represented in 2 bits of precision.

Conventional Bit-Parallel Processing

Figure 14A:
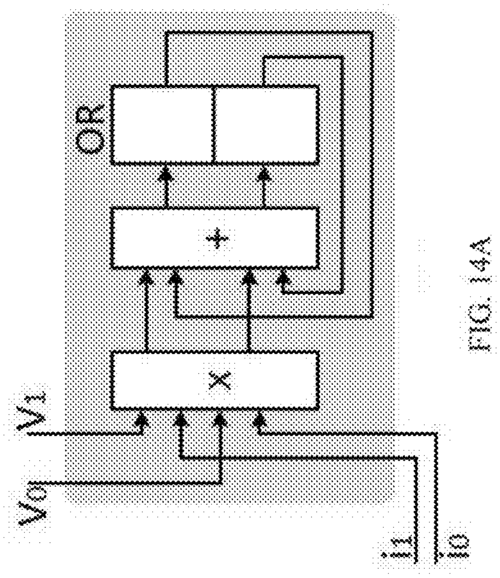
FIG. 14A is a prior art bit-parallel processing engine representative of DaDN.
Figure 14B:
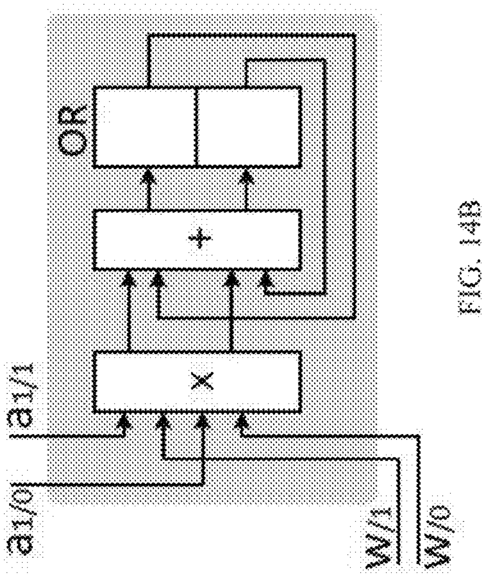
FIGS. 14B and 14C show the processing of a convolutional layer over two cycles.
Figure 14C:
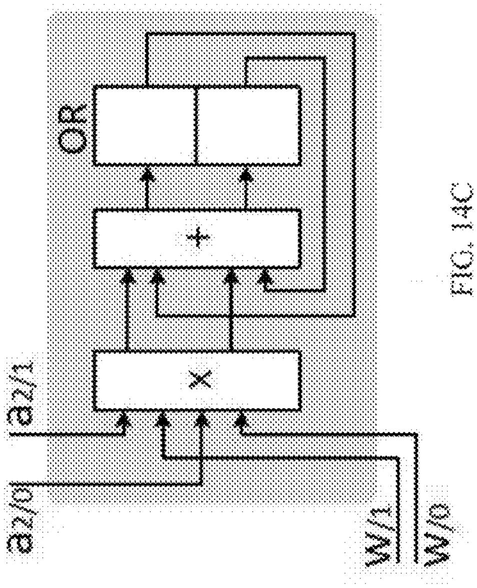

FIGS. 14A to 14C show a bit-parallel engine processing the convolutional layer over two cycles. FIG. 14A shows a prior art bit-parallel processing engine representative of DaDN. Every cycle, the engine can calculate the product of two 2-bit inputs, i (weight) and v (activation) and accumulate or store it into the output register OR. FIGS. 14B and 14C show how this unit can calculate the example CVL over two cycles. In FIG. 14B, during cycle 1, the unit accepts along the v input bits 0 and 1 of $a_0$ (noted as $a_{1/0}$ and $a_{1/1}$ respectively on the FIG.), and along the i input bits 0 and 1 of w and produces both bits of output $c_1$. Similarly, during cycle 2 (FIG. 14C), the unit processes $a_2$ and w to produce $c_2$. In total, over two cycles, the engine produced two 2b×2b products. Processing the example FCL also takes two cycles. In the first cycle, $w_1$ and produce $f_1$, and in the second cycle $w_2$ and produce $f_2$.

Bit-Serial Processing

Figure 15A:
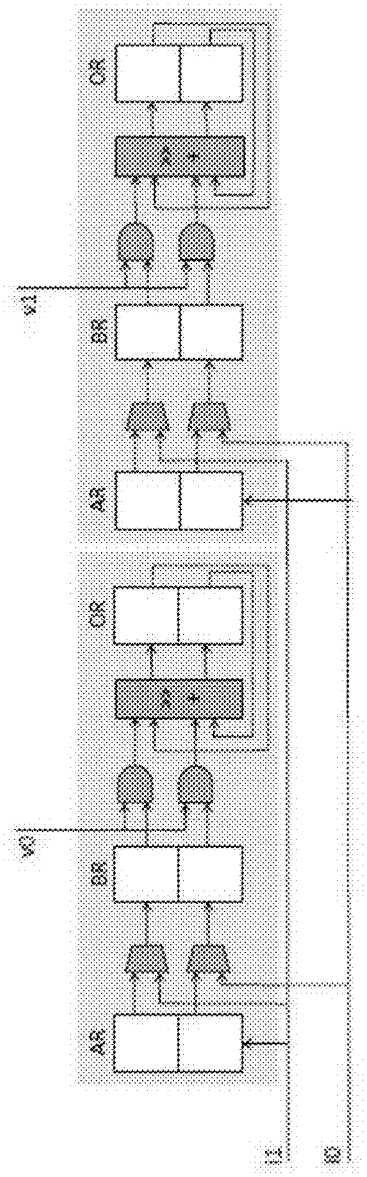
FIGS. 15A to FIG. 15D shows a neural processing unit processing a convolutional layer according to an embodiment of the invention where

FIGS. 15A to 15D shows how an embodiment of our engine would process the example convolutional layer. This embodiment is shown to improve performance over DaDN for fully convolutional layers. FIG. 15A shows the engine's structure which comprises two subunits. The two subunits accept each one bit of an activation per cycle through inputs $v_0$ and $v_1$ respectively and as before, there is a common 2-bit weight input ($i_1$, $i_0$). In total, the number of input bits is 4, the same as in the bit-parallel engine. Each subunit contains three 2-bit registers: a shift-register AR, a parallel load register BR, and a parallel load output register OR. Each cycle each subunit can calculate the product of its single bit vi input with BR which it can write or accumulate into its OR. There is no bit-parallel multiplier since the subunits process a single activation bit per cycle. Instead, two AND gates, a shift-and-add functional unit, and OR form a shift-and-add multiplier/accumulator. Each AR can load a single bit per cycle from one of the i wires, and BR can be parallel-loaded from AR or from the i wires.

Figure 15B:
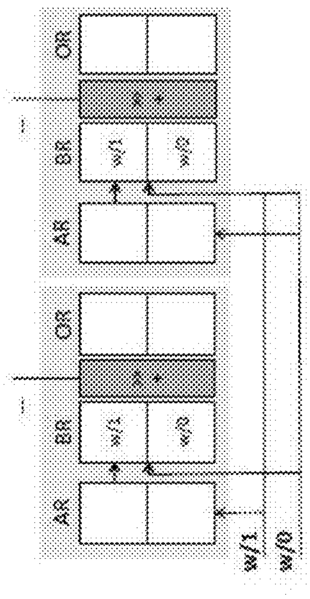
Figure 15C:
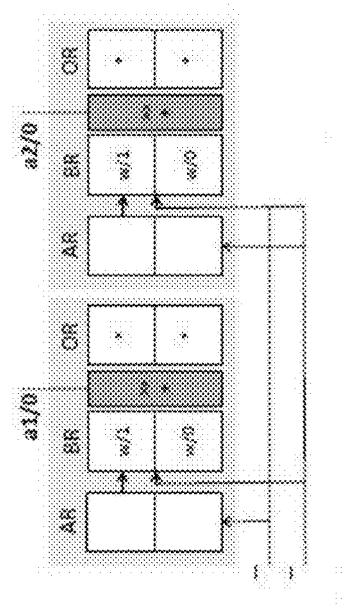
Figure 15D:
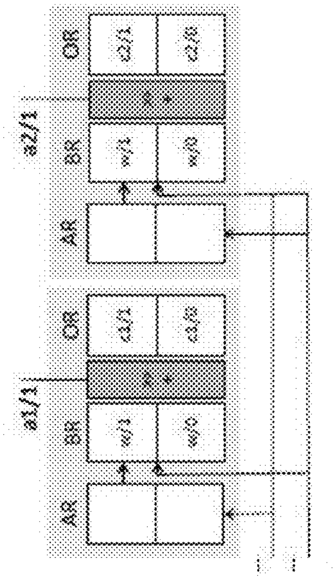

FIG. 15B through FIG. 15D show how our embodiment processes the convolutional layer. The figures abstract away the unit details showing only the register contents. As FIG. 15B shows, during cycle 1, the w synapse is loaded in parallel to the BRs of both subunits via the $i_1$ and $i_0$ inputs. During cycle 2, bits 0 of $a_1$ and of $a_2$ are sent via the $v_0$ and $v_1$ inputs respectively to the first and second subunit. The subunits calculate concurrently $a_{1/1}$×w and $a_{2/1}$×w and accumulate these results into their ORs. Finally, in cycle 3, bit 1 of $a_1$ and $a_2$ appear respectively on $v_0$ and $v_1$. The subunits calculate respectively $a_{1/1}$×w and $a_{2/1}$×w accumulating the final output activations $c_1$ and $c_2$ into their ORs.

In total, it took 3 cycles to process the layer. However, at the end of the third cycle, another w could have been loaded into the BRs (the i inputs are idle) allowing a new set of outputs to commence computation during cycle 4. That is, loading a new weight can be hidden during the processing of the current output activation for all but the first time. In the steady state, when the input activations are represented in two bits, this engine will be producing two 2b×2b terms every two cycles thus matching the bandwidth of the bit-parallel engine.

If the activations $a_1$ and $a_2$ could be represented in just one bit, then this engine would be producing two output activations per cycle, twice the bandwidth of the bit-parallel engine. The latter is incapable of exploiting the reduced precision for reducing execution time. In general, if the bit-parallel hardware was using $P_{BASE}$ bits to represent the activations while only $P^L_a$ bits were enough, this embodiment would outperform the bit-parallel engine by $P_{BASE}/P^L_a$.

Figure 16A:
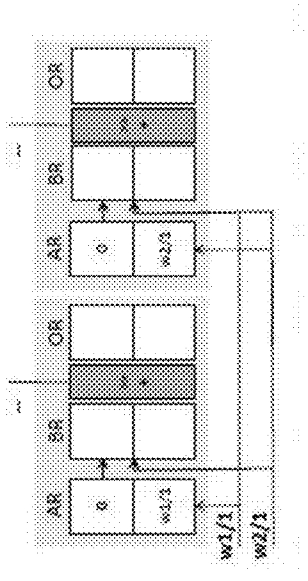
FIGS. 16A to 16E shows a neural processing unit processing a fully-connected layer according to an embodiment of the invention.
Figure 16B:
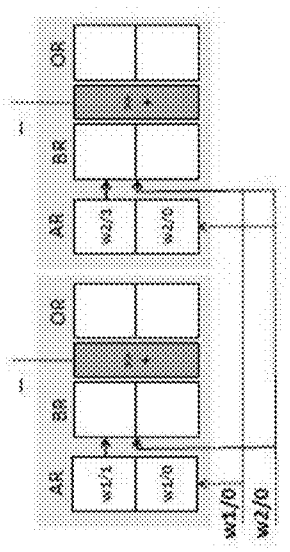
Figure 16C:
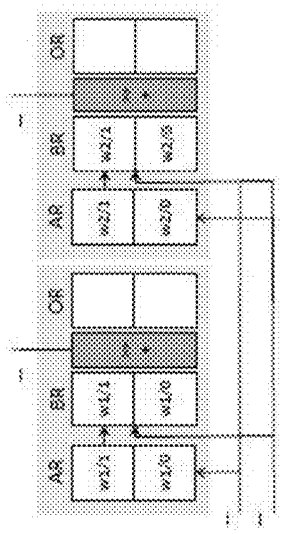
Figure 16D:
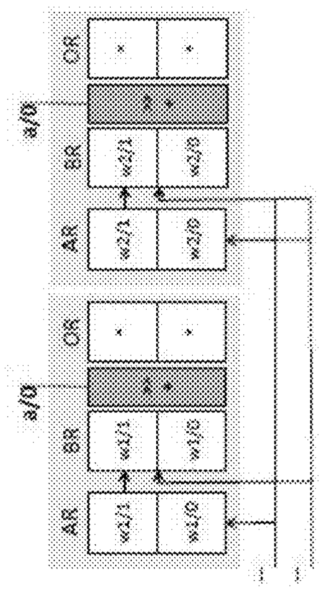
Figure 16E:
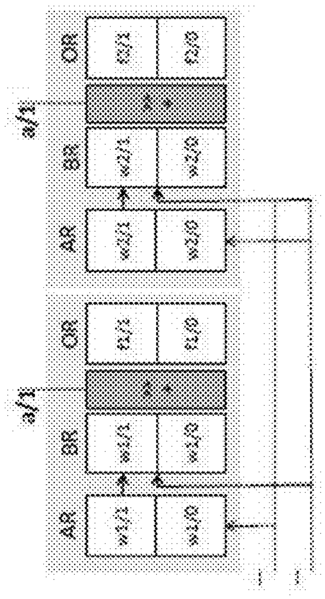

FIGS. 16A to 16E show how an embodiment of our unit would process the example fully-connected layer. As FIG. 16A shows, in cycle 1, bit 1 of $w_1$ and of $w_2$ appear respectively on lines $i_1$ and $i_0$. The left subunit's AR is connected to $i_1$ while the right subunit's AR is connected to $i_0$. The ARs shift in the corresponding bits into their least significant bit sign-extending to the vacant position (shown as a 0 bit on the example). During cycle 2, as FIG. 16B shows, bits 0 of $w_1$ and of $w_2$ appear on the respective i lines and the respective ARs shift them in. At the end of the cycle, the left subunit's AR contains the full 2-bit $w_1$ and the right subunit's AR the full 2-bit $w_2$. In cycle 3, FIG. 16C shows that each subunit copies the contents of AR into its BR. From the next cycle, calculating the products can now proceed similarly to what was done for the CVL. In this case, however, each BR contains a different weight whereas when processing the CVL in the previous section, all BRs held the same w value. The shift capability of the ARs coupled with having each subunit connect to a different i wire allowed TRT to load a different weight bit-serially over two cycles. FIG. 16D and FIG. 16E show cycles 4 and 5 respectively. During cycle 4, bit 0 of $a_1$ appears on both v inputs and is multiplied with the BR in each subunit. In cycle 5, bit 1 of $a_1$ appears on both v inputs and the subunits complete the calculation of $f_1$ and $f_2$. It takes two cycles to produce the two 2b×2b products once the correct inputs appear into the BRs.

While in our example no additional inputs nor outputs are shown, it would have been possible to overlap the loading of a new set of w inputs into the ARs while processing the current weights stored into the BRs. That is the loading into ARs, copying into BRs, and the bit-serial multiplication of the BRs with the activations is a 3-stage pipeline where each stage can take multiple cycles. In general, assuming that both activations and weights are represented using 2 bits, this engine would match the performance of the bit-parallel engine in the steady state. When both set of inputs i and v can be represented with fewer bits (1 in this example) the engine would produce two terms per cycle, twice the bandwidth of the bit-parallel engine of the previous section.

In general, if $P_{BASE}$ the precision of the bit-parallel engine, and $P^L_a$ and $P^L_W$ the precisions that can be used respectively for activations and weights for layer L, an engine according to an embodiment can ideally outperform an equivalent bit parallel engine by $P_{BASE}/P^L_a$ for convolutional layer, and by $P_{BASE}/\max(P^L_a, P^L_w)$ for fully-connected layers.

The above example used the simplest engine configuration. Since typical layers exhibit massive parallelism, the engine may be configured with many more subunits while exploiting weight reuse for convolutional layers and activation reuse for fully-connected layers.

Activation Bits at Once

To improve area and power efficiency, the number of activation bits processed at once can be adjusted at design time. The chief advantage of such configurations is that less SIPs are needed to achieve the same throughput—for example, processing two activation bits at once reduces the number of SIP columns from 16 to 8 and their total number to half Although the total number of bus wires is similar, the distance they have to cover is significantly reduced. Likewise, the total number of adders stays similar, but they are clustered closer together. A drawback of these configurations is they forgo some of the performance potential as they force the activation precisions to be a multiple of the number of bits that they process per cycle. A designer can choose the configuration that best meets their area, energy efficiency and performance target. In these configurations, the weights are multiplied with several activation bits at once, and the multiplication results are partially shifted before they are inserted into their corresponding adder tree.

In order to load the weights on time, the SWR subregister 1212 has to be modified so it can load several bits in parallel, and shift that number of positions every cycle. The negation block 1325 (for 2's complement support) will operate only over the most significant product result.

Evaluation

FIG. 17 reports a set of acceptable per layer precisions for various image classification deep learning networks for convolutional and fully connected layers. The table reports a set of reduced precisions that can be used while maintaining accuracy ("100% Accuracy") and further reduced precisions that can be used if a 1% relative reduction in accuracy is acceptable. The columns "Ideal Speedup" report the performance improvement possible relative to a bit-parallel conventional engine that is equivalently configured.

FIG. 18 reports the execution time performance ("Perf" columns) and the relatively Energy Efficiency ("Eff" Columns) of this embodiment relative to DaDianNao for fully connected and convolutional layers and for the "100%" and "99%" relative accuracy precision configurations. FIG. 19 reports the relative performance of an embodiment that processes two activation bits per cycle. Two sets of measurements are reported: 1) relative to DaDianNao, and 2) relative to the bit-serial configuration of table FIG. 18. This set of results uses the "100%" precision configurations.

Determining Per Neuron Group Precisions at Runtime

Our previously described accelerator exploited the variable precision requirements of deep learning neural networks to improve performance and energy efficiency. In the previously described design, the hardware expected that prior to processing each layer, the precision required by that layer would be communicated by the software. These per layer precisions were thus not adjusted at runtime to reflect any additional reduction in precision that may be possible for each layer or even at a smaller granularity. However, the underlying compute units are capable of exploiting precisions on a much finer granularity than a layer. In the described implementation, each chip comprised 16 tiles, each processing 16 filters and 16 weights (synapses) per filters. A set of 256 activations were broadcast to all tiles one bit per cycle. For each layer, the precision of the activations, that is the positions of the most significant and of the least significant bits (MSB and LSB respectively), $n^H$ and $n^L$ were adjusted per layer. However, the precision could easily be adapted at a smaller granularity. For example, the precision could be adjusted per group of 256 activations that are processed concurrently, or per group of 16 activations that are broadcast to the same column of SIPs in the described implementation. According to a further embodiment, it is possible to adjust precision on either the most significant or least significant bit instead of both. This will still provide some improvement in performance and energy efficiency, although not as much as adjusting precision on both.

According to another embodiment the precision p is dynamically adjusted for each group of 256 neurons that are processed concurrently. This determination is performed by the transposer prior to communicating the neurons to the units for processing. For each of the 256 neurons to be sent to the units, $n_i b_j = 0$ where i=0 . . . 255, and for each bit $OR_j$, j=0 . . . 16 and assuming that all neurons are positive, the transposer first calculates the logical OR of all bits at the same position: $OR_j = n_0 b_j + \ldots + n_{255} b_j$, and then applies a leading bit that is 1 detector over $OR_j$, j=0 . . . 16 to determine $n^H$ the highest bit position where a bit that is 1 appears. Similarly, the transposer uses a trailing bit that is 1 detector to determine $n^L$ the lowest bit position where a bit that is 1 appears. To process these neurons, the transposer sends along with the bits also their offset via a set of extra 4 wires. An additional wire indicates the end of processing a neuron group. Assuming that processing starts at the $n^H$ bit, position, a counter keeps track of the current bit position being broadcast and a comparator sets the end of group signal when the units arrive at $n^L$.

Figure 20:
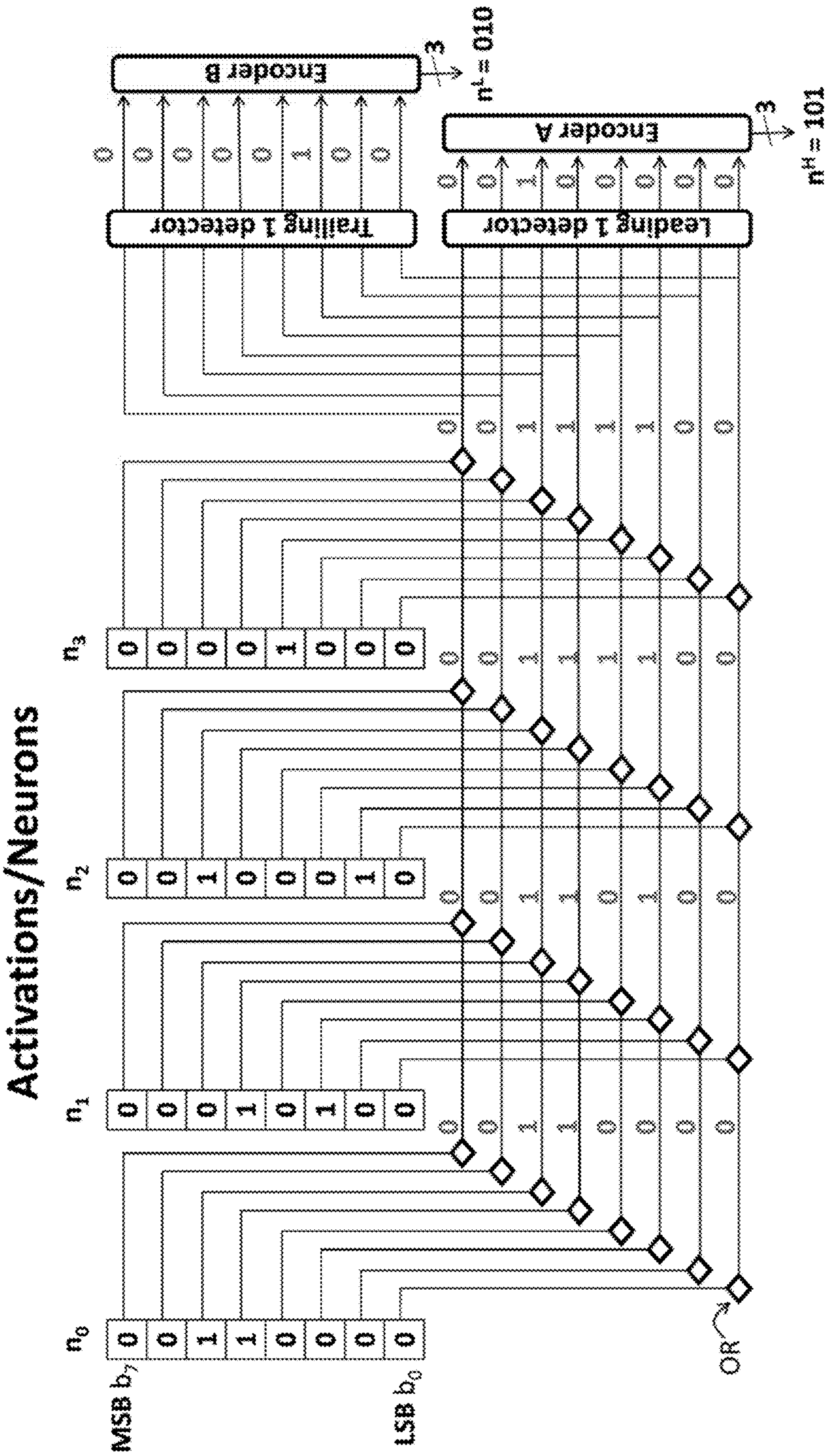
FIG. 20 shows the concurrent processing of a group of four neurons each having a baseline precision of 8 bits according to an embodiment of the invention.

The detection of $n^H$ and $n^L$ is done separately for each subgroup of neurons, such as a group of 16 neurons. FIG. 20 shows such an embodiment, where a group of 4 neurons, each having a baseline precision of 8 bits is processed concurrently. FIG. 20 shows the network calculating the $OR_j$ using a set of cascaded OR gates shown as diamonds, and the $n^H$ detection block plus the offset encoder. The $n^L$ detection uses an identical block as the $n^H$ block with the priority of the $OR_j$ inputs reversed. The figure shows an example of detecting $n^H$ and $n^L$ for a set of neuron values. Since the input neurons use 8 bits, the two offsets are encoded using 3 bits each. To process this group of neurons, the dispatcher will send $n^H$ as the starting offset. The units will decrement this offset every subsequent cycle. The dispatcher will signal the last cycle of processing for this group when the current offset becomes equal to $n^L$. Assuming that processing starts at the $n^H$ bit, position, a counter keeps track of the current bit position being broadcast and a comparator sets the end of group signal when we arrive at $n^L$. Once a group of neurons is processed, the corresponding neuron lanes can be made to wait for all other neuron lanes to finish before advancing to the next group of neuron values. Alternatively, the dispatcher and the synapse buffer can be modified to support per neuron group accesses at the expense of additional area and memory bandwidth.

The dynamic detection of precision can be applied also to weights which could reduce processing time and improve energy efficiency for fully-connected layers and energy efficiency for convolutional layers if power gating is used.

Evaluation Performance

The execution time performance of this embodiment compared to DaDianNao is 2.8×, 2.4×, 2.6×, 3.2×, 3.3×, 1.7×, and 2.6× respectively for AlexNet, NiN, GoogLeNet, VGG_2, VGGS, VGG19, and on average.

Bit Serial Processing of Synapses and Neurons

Another embodiment improves performance by processing not only the neurons bit-serially but the synapses as well. Performance in this embodiment improves by 256/(Ps×Pa) for convolutional layers and by 16/Ps for fully connected layers, where Ps and Pa the precisions of the synapses and the neurons respectively.

Figure 21:
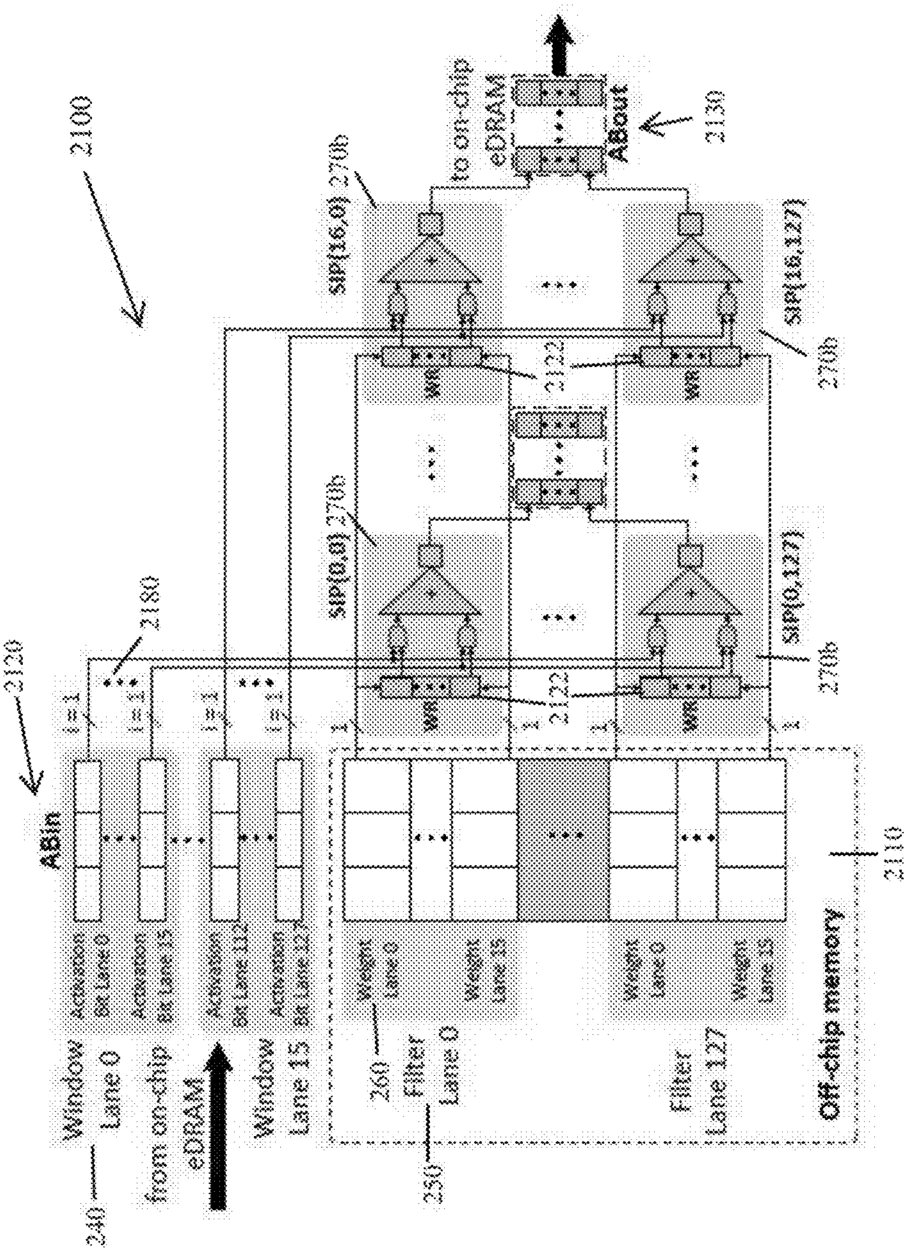
FIG. 21 is a neural processing unit according to an embodiment of the invention.

According to an embodiment, FIG. 21 shows a tile 2100 comprising 2K Serial Inner-Product Units (SIPs) 270*b* organized in a 128×16 grid. This tile 2100 is designed to always perform at least as well as a bit parallel tile processing concurrently 16 neurons and 8 filters, and 16 synapses per filter. Every cycle, each SIP 270*b* multiplies 16 1-bit input activations with 16 1-bit weights and reduces these products into a partial output activation. The SIPs 270*b* along the same row share a common 16-bit weight bus, and the SIPs 270*b* along the same column share a common 16-bit activation bus 2180. Each SIP 270*b* has a 16-bit Weight Register WR 2122. The SIP array is fed by a 2K bit weight bus and a 256-bit activation input bus. The tile 2100 has an ABout 2130 and an ABin 2120 to store output and input activations (neurons) respectively. The tile 2100 processes both activations and weights bit-serially.

Processing convolutional layers starts by reading in parallel 2K weight bits from the off-chip memory 2110, loading 16 bits to all WRs 2122 per SIP row. The loaded weights will be multiplied by 16 corresponding activation bits per SIP column bit-serially over $P_a^L$ cycles where $P_a^L$ is the activation precision for this layer L. Then, after $P_a^L$ cycles, the second bit of weights will be loaded into WRs 2122 and will be multiplied with the same set of 16 corresponding activation bits per SIP row as in the first $P_a^L$ cycles, and so on. In total, the bit-serial multiplication will take $P_a^L \times P_w^L$ cycles, where $P_w^L$ the weight precision for this layer L. Whereas a bit-parallel engine would process 16 sets of 16 activations and 128 filters over 256 cycles, this embodiment processes them concurrently but bit-serially over $P_a^L \times P_w^L$ cycles. If $P_a^L$ and/or $P_w^L$ are less than 16, this embodiment will outperform a bit-parallel engine by $256/(P_a^L \times P_w^L)$. Otherwise, this embodiment may match the performance of a bit-parallel engine.

Processing fully connected layers starts by loading the LSBs (least significant bits) of a set of weights into the WR registers 2122 of the first SIP column and multiplying the loaded weights with the LSBs of the corresponding activations. In the second cycle, while the first column of SIPs is still busy with multiplying the LSBs of its WRs 2122 by the second bit of the activations, the LSBs of a new set of weights can be loaded into the WRs 2122 of the second SIP column. Each weight bit is reused for 16 cycles multiplying with bits 0 through bit 15 of the input activations. Thus, there is enough time for this embodiment to keep any single column of SIPs 270*b* busy while loading new sets of weights to the other 15 columns. For example, as shown in FIG. 21, the engine can load a single bit of 2K weights to SIP(0,0). SIP(0,127) in cycle 0, then load a single-bit of the next 2K weights to SIP(1,0) . . . SIP(1,127) in cycle 1, and so on. After the first 15 cycles, all SIPs are fully utilized. It will take PwL×16 cycles for this design to process 16 sets of 16 activations and 128 filters while an equivalent bit-parallel design processes them in 256 cycles. Thus, when $P_w^L$ is less than 16, this design will outperform the bit-parallel design by $16/P_w^L$ and it may match its performance otherwise.

Figure 22:
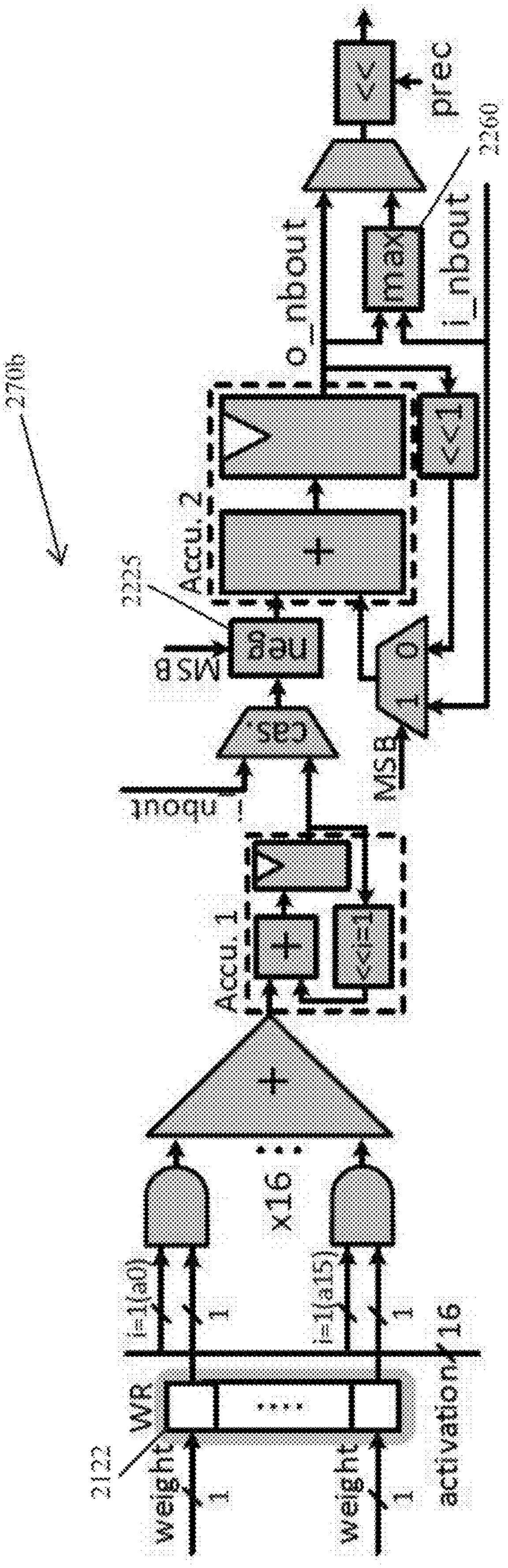
FIG. 22 is a bit serial inner product unit (SIP) according to an embodiment of the invention.

FIG. 22 shows the modified Bit-Serial Inner-Product Unit (SIP) 270*b* for this embodiment. Every clock cycle, each SIP 270*b* multiplies 16 single-bit activations by 16 single-bit weights to produce a partial output activation. Internally, each SIP has 16 1-bit Weight Registers (WRs) 2122, 16 2-input AND gates to multiply the weights in the WRs with the incoming input activation bits, and a 16-input 1-bit adder tree that sums these partial products.

Accu. 1 accumulates and shifts the output of the adder tree over $P_a^L$ cycles. Every $P_a^L$ cycles, Accu. 2 shifts the output of Accu. 1 and accumulates it into the OR. After $P_a^L \times P_w^L$ cycles the Output Register (OR) contains the inner-product of an activation and weight set. In each SIP, a multiplexer after Accu. 1 implements cascading. To support signed 2's complement activations, a negation block 2225 is used to subtract the sum of the input activations corresponding to the most significant bit (MSB) of weights from the partial sum when the MSB is 1. Each SIP 270*b* also includes a comparator (max) 2260 to support max pooling layers. The i_nbout input supports the cascade mode for fully-connected layers that have fewer than 2K outputs.

Figure 28A:
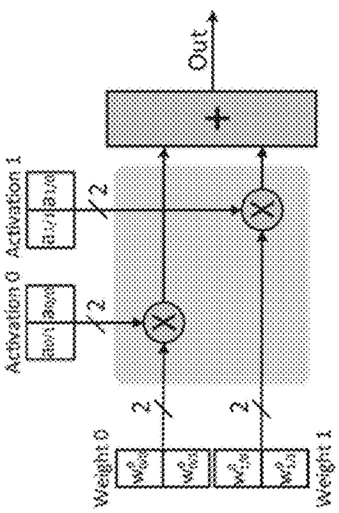
FIG. 28A shows a conventional bit-parallel processing engine processing an example 2b×2b layer over two cycles and FIG. 28B through FIG. 28F show how an embodiment of the invention would process a fully connected layer.

This next section explains how this embodiment may process convolutional and fully connected layers assuming 2-bit activations and weights. FIG. 28A shows a conventional bit-parallel processing engine which multiplies two input activations with two weights generating a single 2-bit output activation per cycle. The engine can process two new 2-bit weights and/or activations per cycle a throughput of two 2b×2b products per cycle.

Figure 28B:
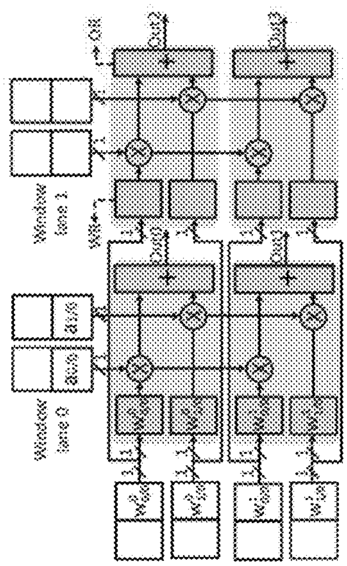

According to an embodiment of the present invention, FIG. 28B shows an engine comprising four subunits organized in a 4×4 array. Each subunit accepts 2 bits of input activations and 2 bits of weights per cycle. The subunits along the same column share the activation inputs while the subunits along the same row share their weight inputs. In total, this engine accepts 4 activation and 4 weight bits equaling the input bandwidth of the bit parallel engine. Each subunit has two 1-bit Weight Registers (WRs), one 2-bit Output Register (OR), and can perform two 1b×1b products which it can accumulate into its OR.

Figure 28C:
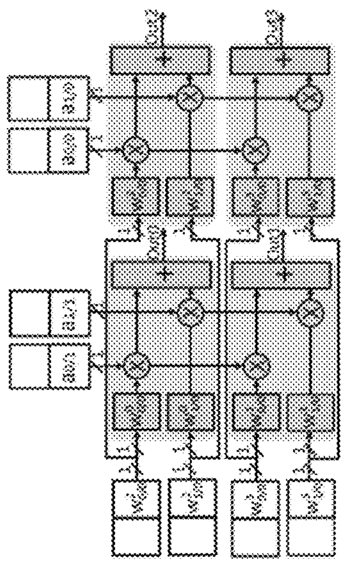
Figure 28D:
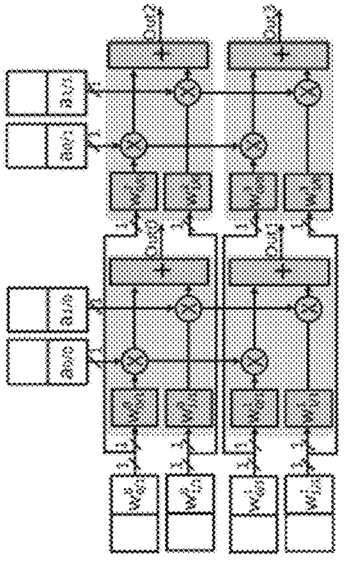
Figure 28E:
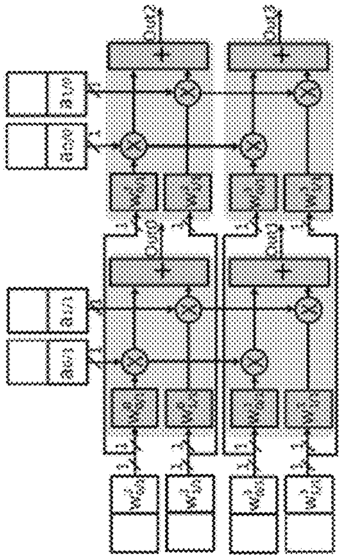
Figure 28F:
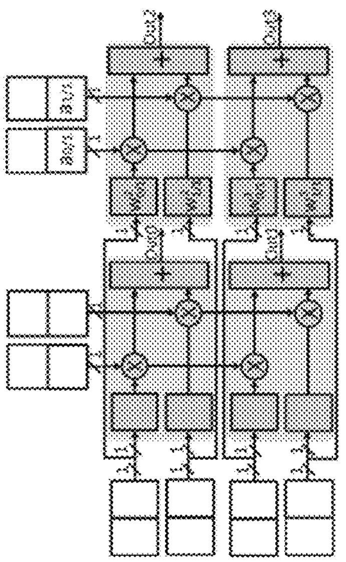

FIG. 28B through FIG. 28F show how this embodiment would process a fully connected layer. As FIG. 28B shows, in cycle 1, the left column subunits receive the least significant bits (LSBs) $a_{0/0}$ and $a_{1/0}$ of activations $a_0$ and $a_1$, and $w^0_{0/0}$, $w^0_{1/0}$, $w^1_{0/0}$, and $w^1_{1/0}$, the LSBs of four weights from filters 0 and 1. Each of these two subunits calculates two 1b×1b products and stores their sum into its OR. In cycle 2, as FIG. 28C shows, the left column subunits now multiply the same weight bits with the most significant bits (MSBs) $a_{0/1}$ and $a_{1/1}$ of activations $a_0$ and $a_1$ respectively accumulating these into their ORs. In parallel, the two right column subunits load $a_{0/0}$ and $a_{1/0}$, the LSBs of the input activations $a_0$ and $a_1$, and multiply them by the LSBs of weights $w^2_{0/0}$, $w^2_{1/0}$, $w^3_{0/0}$, and $w^3_{1/0}$ from filters 2 and 3. In cycle 3, the left column subunits now load and multiply the LSBs $a_{0/0}$ and $a_{1/0}$ with the MSBs $w^0_{0/1}$, $w^0_{1/1}$, $w^1_{0/1}$, and $w^1_{1/1}$ of the four weights from filters 0 and 1. In parallel, the right subunits reuse their WR-held weights $w^2_{0/0}$, $w^2_{1/0}$, $w^3_{0/0}$, and $w^3_{1/0}$ and multiply them the most significant bits $a_{0/1}$ and $a_{1/1}$ of activations $a_0$ and $a_1$ (FIG. 28D). As FIG. 28E illustrates, in cycle 4, the left column subunits multiply their WR-held weights and $a_{0/1}$ and $a_{1/1}$ the MSBs of activations $a_0$ and $a_1$ and finish the calculation of output activations $o_0$ and $o_1$. Concurrently, the right column subunits load $w^2_{0/1}$, $w^2$ $w^3_{0/1}$, and $w^3_{1/1}$, the MSBs of the weights from filters 2 and 3 and multiply them with $a_{0/0}$ and $a_{1/0}$. In cycle 5, as FIG. 28F shows, the right subunits complete the multiplication of their WR-held weights and $a_{0/1}$ and $a_{1/1}$ the MSBs of the two activations. By the end of this cycle, output activations $o_2$ and $o_3$ are ready as well.

In total, it took 4+1 cycles to process 32 1b×1b products (4, 8, 8, 8, 4 products in cycles 2 through 5, respectively). Notice that at the end of the fifth cycle, the left column subunits are idle, thus another set of weights could have been loaded into the WRs allowing a new set of outputs to commence computation. In the steady state, when the input activations and the weights are represented in two bits, this engine will be producing 8 1b×1b terms every cycle thus matching the 2 2b×2b throughput of the parallel engine.

If the weights could be represented using only one bit, this embodiment may be producing two output activations per cycle, twice the bandwidth of the bit-parallel engine. In general, if the bit parallel hardware was using $P_{base}$ bits to represent the weights while only $1^3$, bits were actually required, for the fully-connected layers the engine would outperform the bit-parallel engine by $P_{base}/P_w$. Since there is no weight reuse in fully-connected layers, $C_n$ cycles are required to load a different set of weights to each of the $C_n$ columns. Thus, having activations that use less than $C_n$ bits would not improve performance, but could improve energy efficiency.

This embodiment processes convolutional layers mostly similarly to fully-connected layers but exploits weight reuse across different windows to exploit a reduction in precision for both weights and activations. Specifically, in convolutional layers the subunits across the same row share the same weight bits which they load in parallel into their WRs in a single cycle. These weight bits are multiplied by the corresponding activation bits over $P_a$ cycles. Another set of weight bits needs to be loaded every $P_a$ cycles, where $P_a$ is the input activation precision. Here this embodiment exploits weight reuse across multiple windows by having each subunit column process a different set of activations. Assuming that the bit-parallel engine uses $P_{base}$ bits to represent both input activations and weights, this embodiment may outperform the bit parallel engine by $P^2_{base}/(P_w \times P_a)$ where $P_w$ and $P_a$ are the weight and activation precisions respectively.

Cascade Mode

For the aforementioned embodiment to be fully utilized a fully connected layer should have at least 2K output neurons. Some of the networks studied have a layer with as little as 1K output activations. To avoid underutilization, the SIPs 270*b* along each row are cascaded into a daisy-chain, where the output of one can feed into an input of the next via a multiplexer. This way, the computation of an output activation can be sliced over the SIPs along the same row. In this case, each SIP processes only a portion of the input activations resulting into several partial output activations along the SIPs on the same row. Over the next NP cycles, where NP is the number of slices used, the NP partial outputs can be reduced into the final output activation. The user can choose any number of slices up to 16, so that engine can be fully utilized even with fully-connected layers of just 256 outputs. This cascade mode can be useful in other Deep Learning networks such as in NeuralTalk [Andrej Karpathy and Fei-Fei Li, "Deep Visual-Semantic Alignments for Generating Image Descriptions", CoRR abs/1412.2306 (2014). http://arxiv.org/abs/1412.2306] where the smallest fully connected layers can have 600 outputs or fewer. This cascade mode may also be used with other aforementioned embodiments.

Processing More Than One Bit Per Cycle

It is possible to trade off some of the execution time performance benefits to reduce the number of SIPs and the respective area overhead by processing more than one bit activation per cycle. Using this method, an embodiment would require fewer SIPs 270*b* to match the throughput of an equivalently configured bit-parallel engine.

Evaluation Performance

FIG. 23 reports a set of valid per layer precisions for the fully-connected layers and for the synapses/weights. The precisions for the activations are as reported in FIG. 17. FIG. 24 reports execution time performance relative to an equivalently configured DaDianNao and for two configurations: 1) the first processes two activation bits per cycle ("2-bit"), and 2) the second processes 4 activation bits per cycle ("4-bit"). The two configurations need respectively 8 and 4 SIP columns. Since activations now are forced to be a multiple of 2 or 4 respectively, these configurations give up some of the performance potential. For example, for the 4-bit configuration reducing $P_aL$ from 8 to 5 bits produces no performance benefit, whereas for the bit-serial configuration it would improve performance by 1.6×.

Skipping Zero Bits

The embodiments described thus far trim activation precisions such that a number of leading and trailing bits are treated as zero. However, there will still be some bits that are zero that will be processed. Another embodiment eliminates these and improves performance by skipping the neuron bits that are zero. In the bit serial tile and at each cycle, each neuron bit is ANDed with several synapses. When the neuron bit is zero the result is also zero and contributes nothing to the final output neuron. It is only neuron bits that are one that contribute to the output neuron value. Accordingly, the bit serial tile can be extended to process only the neuron bits that are one.

Figure 25:
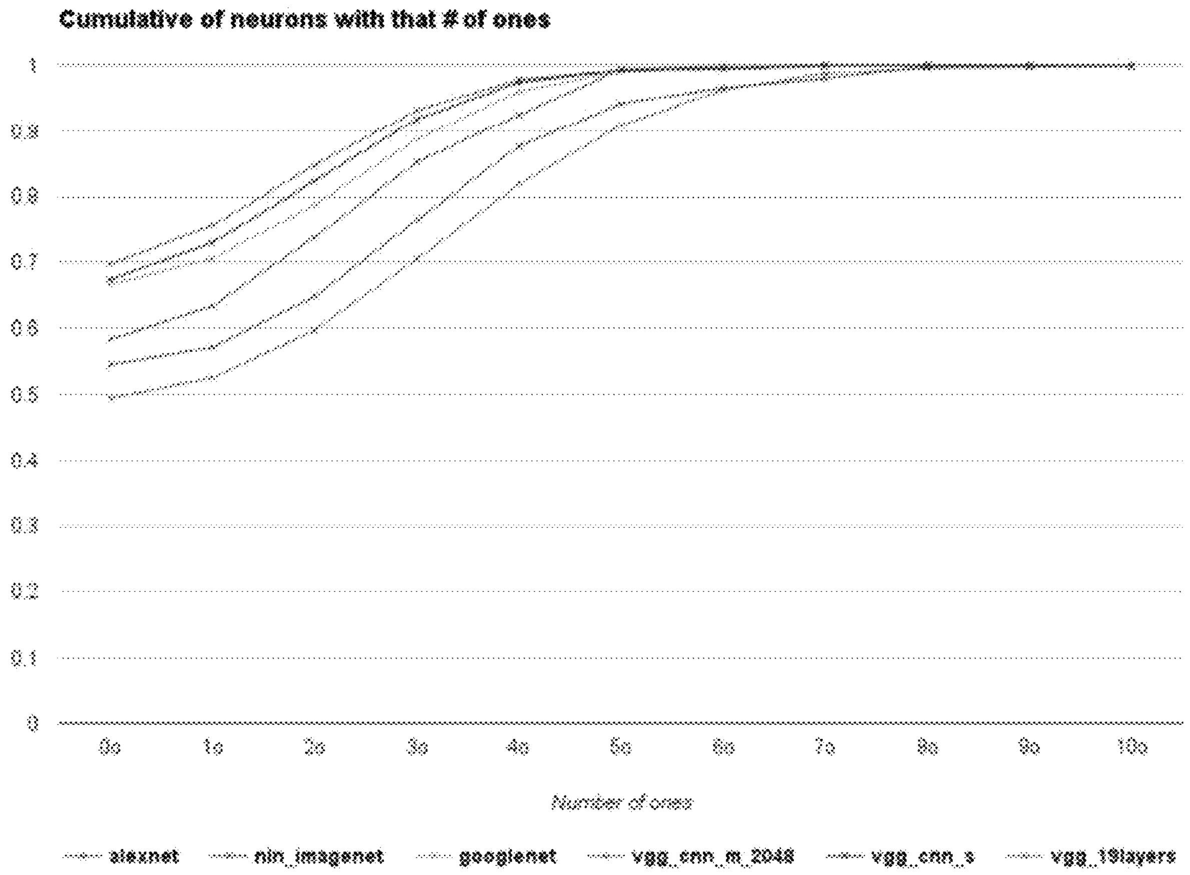
FIG. 25 is a cumulative line graph of one bit counts per input neurons per network.

FIG. 25 shows the cumulative distribution of the count of one bits for the input neurons per network. For all networks, at least 90% of the input neurons have at most 5 bits that are one and virtually all input neurons have at most eights bits that are one. Accordingly, a bit serial tile capable of skipping zero bits would need to process up to 5 bits most of the time (90%) and at most 8 bits virtually all of the time.

To process just the bits that are one, the dispatcher is modified so that it communicates only those. Since the relative position of each bit needs to be known in order to appropriately multiply the synapse, in one embodiment the dispatcher communicates the bit offset. For example, if the input neuron had the value 0b11001, the dispatcher will communicate the offsets (0, 3, 4) corresponding to the positions of the bits that are one. Since the baseline uses 16 bit numbers, the offsets need to be 4 bits long. As a result, each neuron wire is replaced with 4 wires. Other lower wire count alternatives may be possible by taking advantage the spatial distribution of the bits that are one. For example, instead of an absolute offset, the dispatcher could communicate a delta in which case the previous example number would be communicated as (0, 2, 1). For this example, the assumption is the use of absolute offsets. In another embodiment, the dispatcher can communicate the neurons as before but at a faster rate, and the conversion to the offset representation can be done locally at each processing tile.

In the original example, all neuron lanes operate in lock step sending the bit at the same offset across all lines. To allow zero bit skipping, the neuron lanes need to be decoupled so that they can communicate bits at different offsets. Having the dispatcher send the offsets makes this straightforwardly possible. However, once a neuron is processed completely, the neuron lane needs to process the next input neuron. As a result, the dispatcher would need to fetch it from the NM. In the worst case, all 256 neuron lanes would run completely independent and require neurons belonging each to a different brick. This would require maintaining a 256-brick input buffer at the dispatcher. Worse, it would require making up to 256 independent brick reads from NM. While the bandwidth requirements would not increase more than required by the fraction of bits that are eliminated, the dispatcher would have to arbitrate among these requests. Finally, each SIP would be operating at a different neuron offset and hence would need to fetch a synapse at a different offset as well. This requires that the SB is split across all SIPs, so that each SIP has its own SB slice.

The number of independent brick requests that are needed to support zero bit skipping can be reduced by grouping neuron lanes and requiring that they advance to the next set of input neurons only after all neuron lanes within the group finished processing their current neurons. There are multiple design options. At one end of the spectrum is the design where all neuron lanes operate independently. This has the potentially undesired requirements of having to fetch up to 256 different neuron bricks at the dispatcher and having to provide a separate SB slice per SIP. At the other end of the spectrum is a design where all neuron lanes form a single group. In this design, each neuron lane operates at a different neuron bit offset, but all neuron lanes are allowed to advance to the next set of neurons only when all current neurons have been processed. That is, in this case, all neuron lanes wait for the neuron lane that is processing the neuron with the highest count of bits that are one. A potential added advantage of this design is that it does not require that the SB is split at all. The bit serial tile remains as is with only shifters being introduced at the adder tree inputs and the adders being appropriately extended to handle the shifted inputs. There are multiple other choices with a different degree of requirements. For example, we can require that SIPs along the same row form a group, in which case, the SB needs to be split into 16 slices, one per SIP row and the dispatcher needs to maintain up to 16 input bricks from different positions. It could be grouped every two, four, or eight rows similarly. Alternatively, it could group along columns, requiring multiple SB slices and multiple brick fetching from the dispatcher.

When all neuron lanes proceed in lock step, each SB column is read once and reused by all neuron lanes. However, when neuron lanes proceed independently in smaller groups, they will run ahead of each other and will read the same SB column independently and possibly at different times. By adding a set of buffers in front of the SB it is possible service this requests with less energy. In this embodiment, each SB column is read into a buffer slot and kept there until all neuron lanes have read it. The number of buffers dictates how far ahead of each other the neuron lane groups can run.

Figure 26:
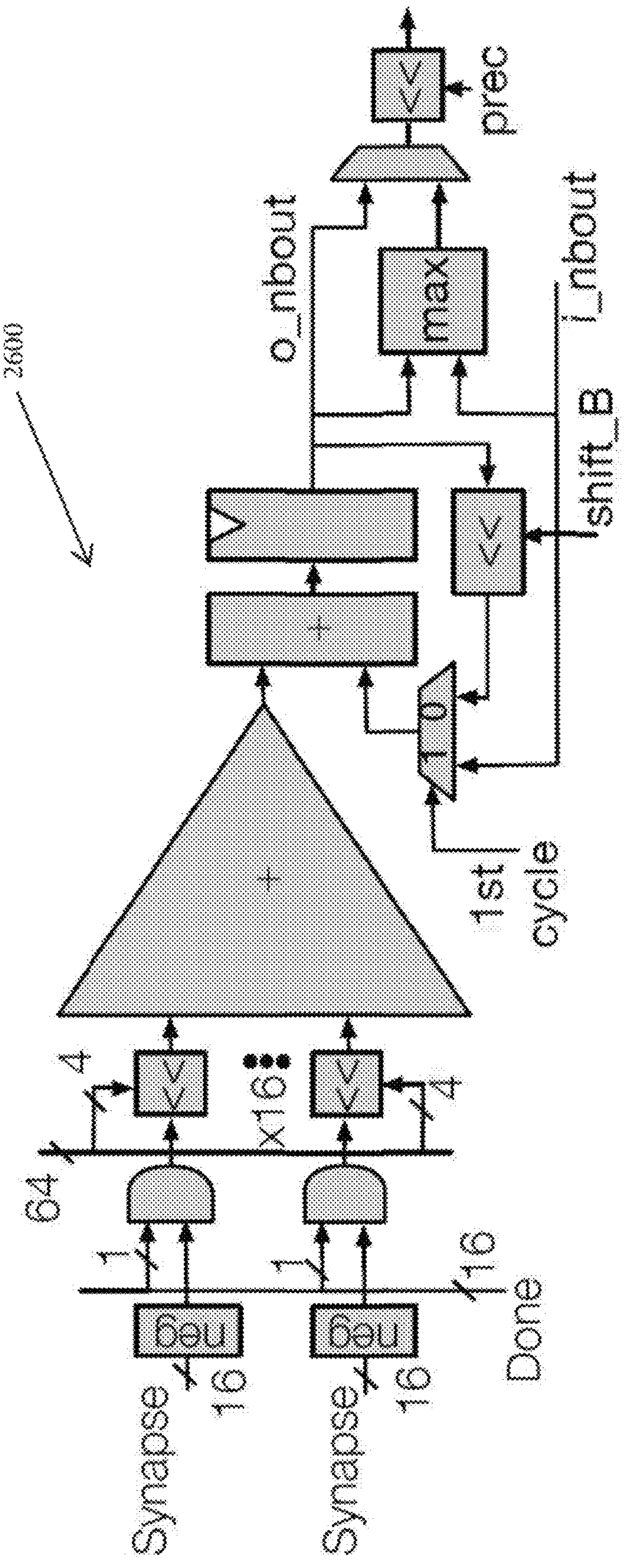
FIG. 26 is a bit serial inner product unit (SIP) according to an embodiment of the invention.

In one embodiment, the AND gates of the bit-serial engine are replaced with shifters so that the weights can be effectively multiplied with the incoming offset which represents a power of two. It is recognized that such a design is expensive in terms of area and power. The reason is that when processing the 16 neuron offsets that feed each adder tree it is possible in the worst case that one of the offsets is 0 and the other 15. As a result, the shifters need to take the 16-bit input synapses and convert them to a 32-bit weight. Furthermore, the adder tree is no longer a 16-bit adder tree but rather a 32-bit adder tree. By giving up some of the performance potential it is possible to reduce the area and energy overhead using a “2-stage-shifting” approach. Specifically, in another embodiment, the input neurons are processed in groups of bits, for example as 4 groups of 4 bits. For example, given two neurons with offsets (5) and (0), the baseline design would process both concurrently in one cycle. The modified design, would process first only the powers of 0 through 3 and then in another cycle, the powers 4 through 8. Accordingly, in our example, the modified design would process the two neurons in two cycles instead of in one. This design takes advantage of the observation that any shift operation can be performed in two stages as two smaller shifts: $a \ll K = a \ll (K'+C) = ((a \ll K') \ll C)$. Thus, to shift and add T weights by different offsets $K_0, \ldots, K_T$, we can decompose the offsets into sums with a common term C, e.g., $K_i = K' + C$. Accordingly, inner product processing can be rearranged using a two-stage processing where the first stage uses a per weight specific offset K, and the second stage, the common across all weights offset C. This arrangement can be used to reduce the width of the weight shifters and of the adder tree by sharing one common shifter after the adder tree as FIG. 26 shows. A design parameter, L, defines the number of bits controlling the weight shifters so that the design can process offsets which differ by less than $2^L$ in a single cycle. This reduces the size of the weight shifters and reduces the size of the adder tree to support terms of $16+2^L-1$ bits only.

FIG. 26 shows the serial inner product unit 2600 for this embodiment. The shifters shown shift up to 16 bit positions. The shift B signal can be used to implement 2-stage shifting. The Done signal can be used to inhibit accumulating synapse values when a lane is waiting for other lanes to finish.

Figure 27:
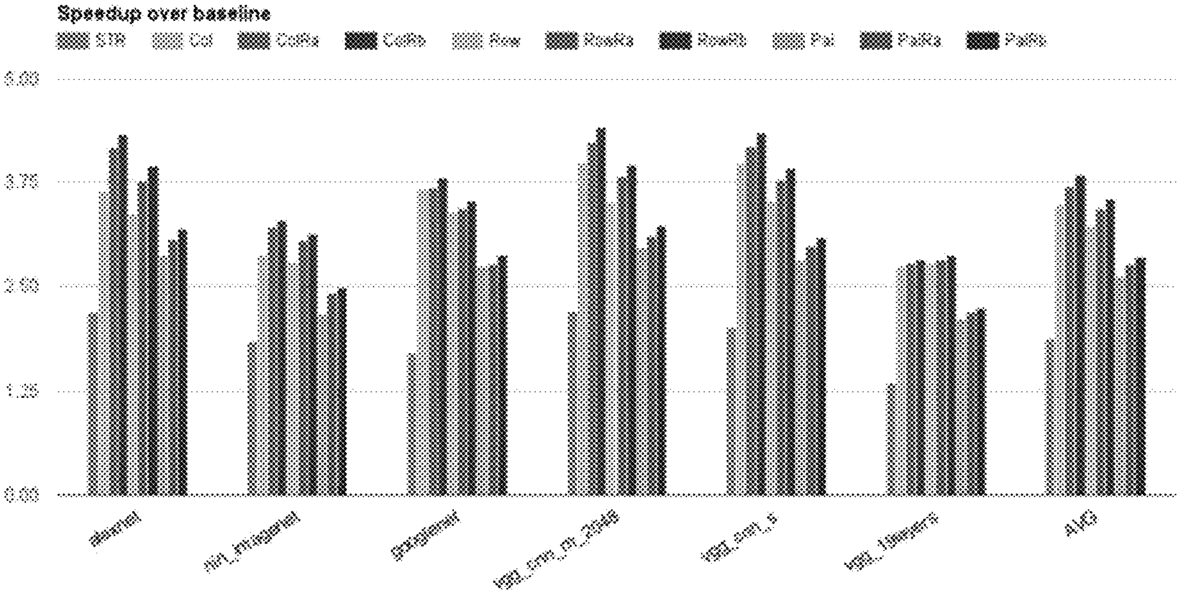
FIG. 27 is a bar graph of zero-bit skipping performance experimental results of an embodiment of the invention.

FIG. 27 shows the performance possible with zero-bit skipping and with different neuron lane groupings. Specifically, the following configurations are shown: COL: Performance skipping zero-bits when the SIPs are synchronized per column; ROW: Performance skipping zero-bits when the SIPs are locked per row; and PAL: Performance skipping zero-bits when the SIPs are locked per pallet, that is all SIPs are synchronized.

The per column design achieves the highest performance possible, followed by the row design and finally, the pallet design. The pallet design synchronizes all SIP units and thus has the most constraints. However, it is the simplest to implement as the dispatcher and the SB remain as-is. The row design requires that the SB is split along the rows into 16 slices and the dispatcher needs to keep track of 16 independent bricks.

Improved Encoding

Since the SIPs can negate any input term, it is possible to reduce the offsets that are processed for activation values containing runs of ones by allowing signed offsets using Booth encoding. This improved offset generator reduces runs of adjacent offsets A . . . B into pairs of the form A+1, −B. Single offsets or gaps inside runs are represented by a positive or negative offsets, respectively. For example, an activation value of 11011 that would normally be encoded with offsets (4,3,1,0) can instead be represented with (5,−3,+2,−0) or even more economically with offsets (5, −2,−0). This is equivalent to a Radix-4 Booth encoding. This encoding will never produce more offsets compared to the baseline encoding. However, because of the 2-stage shifting, it is possible that this encoding will increase the number of cycles needed. This will happen when the offset distribution among the bit groups being processed together during 2-stage shifting changes.

In addition to the zero-bit skipping designs described, FIG. 13 also shows two extensions per option where the neuron values are altered to reduce the number of bits that are one. In the Ra extension neuron values that are of the form $2^n-1$ where n is the precision used, are converted to $2^n$ whereas in the Rb extension the above conversion is done for all powers of two, that is any number of the form $2^k-1$ is converted to $2^k$. The results show that both techniques can offer an additional performance improvement. No analysis was made of the impact on accuracy. In another encoding, a threshold per layer or per group of neurons determines the maximum number of powers of two that will be processed. For example, if the threshold is 3 and the neuron is encoded as (4,3,0,−1) then only (4,3,0) will be processed.

As will be appreciated by those skilled in the art, in operation the aforementioned components may be controlled by a controller, which may for example be a programmable finite state machine or a programmable processor which may control the accelerator as a functional unit. According to an embodiment, the programmable finite state machine may have several control and data registers and potentially a program and data memory, and outputs the various control signals to the other components described herein in the neural network system.

According to an embodiment, it may also be possible to adapt embodiments of the invention to portions of a layer rather than complete layers. Such alternative approaches to a per-layer computation may, for example, divide the input matrix in the H and W dimensions in a number of partitions. The filters may then be applied on one or more of those partitions to produce a partial output. These partial outputs may be processed as a whole or further divided. The partial outputs may be processed up to the end of the network (assuming no fully connected layers) or stop at some point and go to the division point to continue to process more partitions.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description and all changes which come within the meaning and range of equivalency of the claims are therefore intended to be embraced therein.

What is claimed is:

1. A system for bit-serial computation in a neural network, comprising:

one or more bit-serial tiles for performing bit-serial computations in a neural network wherein each bit-serial tile processes two or more windows in parallel, each bit-serial tile receiving input neurons in two or more windows and synapses in two or more filters, and generating output neurons; and an activation memory for storing neurons and in communication with the one or more bit-serial tiles using a dispatcher, wherein the dispatcher reads neurons from the activation memory and communicates the neurons to the one or more bit-serial tiles via two or more window lanes for each bit-serial tile, wherein the dispatcher reads synapses from a synapse buffer and communicates the synapses to the one or more bit-serial tiles via two or more filter lanes for each bit-serial tile, and wherein one of the neurons or the synapses are communicated to the one or more bit-serial tiles bit-serially and the other of the neurons or the synapses are communicated to the one or more bit-serial tiles bit-parallelly.

2. The system of claim 1, wherein the dispatcher comprises a shuffler to collect the neurons in one or more bricks and a transposer to convert the bricks into serial bit streams and wherein the dispatcher collects the one or more bricks into one of more groups.

3. The system of claim 1, wherein the activation memory is a dedicated memory to the one or more bit-serial tiles.

4. The system of claim 1, wherein each window lane comprises one or more bit-serial neuron lanes.

5. The system of claim 1, wherein the bit-serial tiles each further comprise an input neuron buffer holding input neurons from the dispatcher and a neuron output buffer holding output neurons pending communication to a reducer, wherein the reducer receives the output neurons from the one or more bit-serial tiles, and communicates the output neurons to the activation memory.

6. The system of claim 5, wherein each filter lane comprises one or more synapse lanes.

7. The system of claim 6, wherein the synapse buffer and the input neuron buffer are in communication with a 2-dimensional array of one or more serial inner product subunits.

8. The system of claim 7, wherein each of the one or more serial inner product subunits produces one output neuron.

9. The system of claim 8, wherein the filter lanes of the synapse buffer are in communication with the corresponding serial inner product subunits via an interconnect.

10. The system of claim 9, wherein the window lanes of the input neuron buffer are in communication with the corresponding serial inner product subunits via an interconnect.

11. The system of claim 8, further comprising a synapse register for providing one or more synapse groups to the serial inner product subunits.

12. The system of claim 8, wherein each serial inner product subunit comprises a multiple input adder tree.

13. The system of claim 12, wherein each serial inner product subunit further comprises one or more negation blocks.

14. The system of claim 12, wherein each serial inner product subunit further comprises a comparator.

15. The system of claim 1, wherein the dispatcher comprises a shuffler to collect the neurons in one or more bricks and a transposer to convert the bricks into serial bit streams and wherein the shuffler comprises one or more multiplexers.

16. The system of claim 1, wherein the synapses are communicated via a bit-parallel interface.

17. A system for bit-serial computation in a neural network, comprising:

one or more bit-serial tiles for performing bit-serial computations in a neural network wherein the one or more bit-serial tiles process two or more windows in parallel, each bit-serial tile receiving input neurons in two or more windows and synapses in two or more filters, and communicating output neurons; and an activation memory for storing neurons and in communication with the one or more bit-serial tiles using a dispatcher, wherein the dispatcher reads neurons from the activation memory and communicates the neurons to the one or more bit-serial tiles via two or more window lanes for each bit-serial tile, wherein the dispatcher reads synapses from a memory and communicates the synapses to the one or more bit-serial tiles via two or more filter lanes for each bit-serial tile, and wherein the neurons and the synapses are communicated to the one or more bit-serial tiles bit-serially.

18. The system of claim 17, wherein the dispatcher reduces the precision of an input synapse, based on a most significant bit value or a least significant bit value of the input neuron.

19. The system of claim 17, wherein the dispatcher reduces the precision of the input synapse based on the most significant bit value and the least significant bit value of the input neuron.

20. A battery-operated device comprising a bit-serial neural network accelerator, the battery-operated device comprising:

one or more bit-serial tiles for performing bit-serial computations in a neural network wherein the one or more bit-serial tiles process two or more windows in parallel, each bit-serial tile receiving input neurons in two or more windows and synapses in two or more filters, and generating output neurons; and an activation memory for storing neurons and in communication with the one or more bit-serial tiles using a dispatcher, wherein the dispatcher reads neurons from the activation memory and communicates the neurons to the one or more bit-serial tiles via two or more window lanes for each bit-serial tile, wherein the dispatcher reads synapses from a memory and communicates the synapses to the one or more bit-serial tiles via two or more filter lanes for each bit-serial tile, and wherein one of the neurons or the synapses are communicated to the one or more bit-serial tiles bit-serially and the other of the neurons or the synapses are communicated to the one or more bit-serial tiles bit-parallelly.

* * * * *